US011657418B2

(12) United States Patent
Waltman et al.

(10) Patent No.: US 11,657,418 B2
(45) Date of Patent: May 23, 2023

(54) CAPACITY OPTIMIZED ELECTRONIC MODEL BASED PREDICTION OF CHANGING PHYSICAL HAZARDS AND INVENTORY ITEMS

(71) Applicant: Yembo, Inc., San Diego, CA (US)

(72) Inventors: Devin Waltman, San Diego, CA (US); Siddharth Mohan, San Diego, CA (US); Anoop Jakka, San Diego, CA (US); Marc Eder, San Diego, CA (US); Maciej Halber, San Diego, CA (US); Zachary Rattner, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 125 days.

(21) Appl. No.: 17/193,957

(22) Filed: Mar. 5, 2021

(65) Prior Publication Data

US 2021/0279811 A1    Sep. 9, 2021

Related U.S. Application Data

(60) Provisional application No. 62/986,061, filed on Mar. 6, 2020.

(51) Int. Cl.
*G06Q 30/02* (2023.01)
*G06Q 30/0204* (2023.01)
(Continued)

(52) U.S. Cl.
CPC ..... *G06Q 30/0205* (2013.01); *G06F 3/04842* (2013.01); *G06F 16/29* (2019.01);
(Continued)

(58) Field of Classification Search
CPC .......................... G06Q 40/08; H04N 5/232933
See application file for complete search history.

(56) References Cited

U.S. PATENT DOCUMENTS

| 9,978,033 B1 | 5/2018 | Payne et al. |
| 10,289,760 B1 | 5/2019 | Oakes, III et al. |

(Continued)

FOREIGN PATENT DOCUMENTS

| KR | 10-2019-0117354 A | 10/2019 |
| WO | 2019-016685 A1 | 1/2019 |
| WO | 2019-191329 A1 | 10/2019 |

OTHER PUBLICATIONS

Nesterov, Lectures on Convex Optimization, 2nd. Ed., Springer, 2018, pg. xiii (Year: 2018).*

(Continued)

*Primary Examiner* — Scott C Anderson
(74) *Attorney, Agent, or Firm* — Pillsbury Winthrop Shaw Pittman LLP

(57) ABSTRACT

The process of obtaining an insurance quote is currently based on information provided by filing online forms. Insurance companies use the consumer input data from online the forms to provide a quote for property insurance and for insurance underwriting. To complete the underwriting, the insurance companies have to make assumptions on various factors; for example, the structure and layout of a consumer's home, what type of content the consumer owns, its value, and its condition, among several others. It is desirable to get more accurate data on the consumer content, the structure and layout of the home, as well as other factors (e.g., hazards such as whether a house is on a canyon) in an automated fashion which would let insurance companies underwrite policies with a more accurate risk profile as well as save costs by not having to send an onsite inspector.

23 Claims, 21 Drawing Sheets

(51) Int. Cl.

| | | |
|---|---|---|
| G06Q 40/08 | (2012.01) | |
| G06F 16/29 | (2019.01) | |
| G06N 20/00 | (2019.01) | |
| G06Q 10/0875 | (2023.01) | |
| G06Q 10/0639 | (2023.01) | |
| G06T 7/00 | (2017.01) | |
| G06Q 30/0201 | (2023.01) | |
| G06N 3/08 | (2023.01) | |
| G06T 17/00 | (2006.01) | |
| G06T 7/80 | (2017.01) | |
| G06T 7/50 | (2017.01) | |
| G06F 3/04842 | (2022.01) | |
| G06T 7/20 | (2017.01) | |
| G06T 17/20 | (2006.01) | |
| G06V 20/00 | (2022.01) | |
| G06N 3/044 | (2023.01) | |
| H04N 23/63 | (2023.01) | |
| G06V 10/764 | (2022.01) | |
| G06V 10/82 | (2022.01) | |
| G06V 20/64 | (2022.01) | |
| G01S 17/06 | (2006.01) | |
| G06Q 50/16 | (2012.01) | |
| G01S 19/42 | (2010.01) | |
| G06F 18/24 | (2023.01) | |

(52) U.S. Cl.
CPC ............ *G06N 3/044* (2023.01); *G06N 3/08* (2013.01); *G06N 20/00* (2019.01); *G06Q 10/06395* (2013.01); *G06Q 10/0875* (2013.01); *G06Q 30/0206* (2013.01); *G06Q 40/08* (2013.01); *G06T 7/0002* (2013.01); *G06T 7/20* (2013.01); *G06T 7/50* (2017.01); *G06T 7/80* (2017.01); *G06T 17/00* (2013.01); *G06T 17/20* (2013.01); *G06V 10/764* (2022.01); *G06V 10/82* (2022.01); *G06V 20/00* (2022.01); *G06V 20/64* (2022.01); *H04N 23/631* (2023.01); *G01S 17/06* (2013.01); *G01S 19/42* (2013.01); *G06F 18/24* (2023.01); *G06Q 50/16* (2013.01); *G06T 2207/20081* (2013.01)

(56) References Cited

U.S. PATENT DOCUMENTS

| | | | |
|---|---|---|---|
| 10,325,485 B1 * | 6/2019 | Schuster | ................. G01S 7/497 |
| 10,515,486 B1 | 12/2019 | Chavf7 et al. | |
| 2010/0214284 A1 | 8/2010 | Rieffel et al. | |
| 2015/0073834 A1 | 3/2015 | Gurenko et al. | |
| 2015/0294499 A1 | 10/2015 | Wagner et al. | |
| 2017/0206648 A1 * | 7/2017 | Marra | ................... G01C 11/00 |
| 2017/0221152 A1 | 8/2017 | Nelson et al. | |
| 2018/0069932 A1 | 3/2018 | Tiwari et al. | |
| 2019/0012804 A1 | 1/2019 | Wang et al. | |
| 2019/0114717 A1 | 4/2019 | Labrie et al. | |
| 2019/0147220 A1 | 5/2019 | McCormac et al. | |
| 2019/0188797 A1 | 6/2019 | Przechocki et al. | |
| 2019/0220793 A1 | 7/2019 | Saarenvirta | |
| 2019/0236732 A1 | 8/2019 | Speasl et al. | |
| 2019/0295011 A1 | 9/2019 | Shi et al. | |
| 2020/0094405 A1 | 3/2020 | Davidson et al. | |
| 2020/0151963 A1 | 5/2020 | Lee et al. | |
| 2020/0167695 A1 * | 5/2020 | Buesser | ................. G06N 5/043 |

OTHER PUBLICATIONS

Patent Cooperation Treaty, International Search Report issued in PCT/IB2021/051875, dated Jun. 10, 2021, pp. 1-3.

Patent Cooperation Treaty, International Search Report issued in PCT/IB2021/051869, dated Jun. 9, 2021, pp. 1-4.

Patent Cooperation Treaty, International Search Report issued in PCT/IB2021/051878, dated Jun. 4, 2021, pp. 1-4.

United States Patent and Trademark Office, Non-Final Office Action issued in U.S. Appl. No. 17/194,075, filed Nov. 29, 2022, pp. 1-26.

* cited by examiner

CAPACITY OPTIMIZED ELECTRONIC MODEL BASED PREDICTION OF CHANGING PHYSICAL HAZARDS AND INVENTORY ITEMS

CROSS REFERENCE TO RELATED APPLICATIONS

This application is based on, and claims the benefit of priority to, provisional application No. 62/986,061, filed Mar. 6, 2020, the entire contents of which are incorporated herein by reference.

DESCRIPTION OF THE RELATED ART

Conventional systems and methods for providing insurance underwriting estimates are lacking. The way estimates are done today are either inaccurate (phone calls/web forms) or very expensive to administer (in-person estimates). Currently, many carriers rely on customer input to provide the requisite information for underwriting and pricing determinations. This approach is cheap for the carrier, but prone to errors in information collection. Alternatively, carriers might send agents out to do an in-person home inspection to collect necessary information. However, this approach is more expensive and time consuming for both the insurer and the homeowner.

SUMMARY

Some aspects of the present disclosure relate to electronically predicting physical hazards at a location and generating an inspection report, and/or other operations. This is performed with one or more machine learning models and/or one or more multi-stage electronic (machine learning) models as described herein, for example. The model(s) are used for predicting physical hazards at a location, determining an inventory of items at the location, generating an inspection report, and/or other operations. The physical hazards and/or the items at the location may be changing over time and from location to location, for example, and whether or not something constitutes a physical hazard is often not well defined, such that these are not straightforward electronic predictions and determinations. The present systems, methods, and computer readable media facilitate making these predictions and determinations with one or more electronic models optimized based on a required computing capability (e.g., costs associated with a large amount of computing capability may make a product commercially unreasonable) and a maximum allowable processing time (e.g., so that these determinations take fractions of a second instead of minutes, hours, or days to complete) to minimize overall computing resources and processing time.

Some aspects of the present disclosure relate to a system configured for generating an inspection report utilizing a machine learning model. The system comprises one or more hardware processors configured by machine-readable instructions to receive description data of a location. The description data is generated via at least one of a camera, a user interface, an environment sensor (e.g., Lidar, a depth sensor, etc.), and an external location information database. The one or more processors are configured to generate an inventory list comprising a plurality of items at the location, utilizing the machine learning model, based on the description data. The inventory list further comprises inventory attributes associated with the plurality of items related to a context of the plurality of items at the location. The one or more processors are configured to determine, utilizing the machine learning model, based on the description data, interior and/or exterior condition information for the location. The interior and/or exterior condition information describes a quality of structural components of the location and/or hazards in and/or around the location. The one or more processors are configured to generate, utilizing the machine learning model, based on the inventory list and the interior and/or exterior condition information, the inspection report for the location.

In some embodiments, the description data comprises one or more media types. The one or more media types comprise at least one or more of video data, image data, audio data, text data, user interface/display data, and/or sensor data. In some embodiments, receiving description data comprises receiving sensor data from one or more environment sensors. The one or more environment sensors comprise at least one of a GPS, an accelerometer, a gyroscope, a barometer, a microphone, Lidar, a depth sensor, and/or other sensors.

In some embodiments, generating the inspection report comprises determining the one or more inventory attributes. The inventory attributes comprise one or more of locations of the items at the location, a quality of items at the location, brand names of the items at the location, materials of the items at the location, damage to items at the location, age of the items at the location, condition of the items at the location, dimensions of the items at the location, or values of the items at the location.

In some embodiments, the description data is captured by a mobile computing device associated with a user and transmitted to the one or more processors with or without user interaction.

In some embodiments, generating the inspection report comprises causing the machine learning model to determine one or more insurance underwriting estimates using at least one or more inventory items, inventory attributes, one or more structures at the location and/or attributes of the structures (e.g., their material composition, a quality of structural components, etc.), whether there are hazards at the location, and/or other information. In some embodiments, inputs for the machine learning model comprise the material and quality of structural components at the location, hazards in and/or around the location, and/or other information.

In some embodiments, the one or more hardware processors are further configured to receive adjustments to the inventory list and/or the interior and/or exterior condition information, and use the adjustments and corresponding inventory attributes, quality of structural components of the location, and/or hazards in and/or around the location, as input to (1) update the inspection report, and/or (2) retrain the machine learning model.

In some embodiments, the description data is time stamped, geo stamped, and/or user stamped.

In some embodiments, the interior and/or exterior condition information comprises a description of a spatial position of the location relative to potential natural hazards. In some embodiments, the description of the spatial position of the location relative to potential natural hazards is determined at least in part based on information from the external location information database.

In some embodiments, the inspection report is determined at least in part based on information from an external market information database.

Some aspects of the present disclosure relate to a method for generating an inspection report utilizing a machine learning model. The method comprises: receiving description data of a location, the description data generated via at least one of a camera, a user interface, an environment sensor, and an external location information database; generating an inventory list comprising a plurality of items at the location, utilizing the machine learning model, based on the description data, the inventory list further comprising inventory attributes associated with the plurality of items related to a context of the plurality of items at the location; determining, utilizing the machine learning model, based on the description data, interior and/or exterior condition information for the location, the interior and/or exterior condition information describing a quality of structural components of the location and/or hazards in and/or around the location; and generating, utilizing the machine learning model, based on the inventory list and the interior and/or exterior condition information, the inspection report for the location.

In some embodiments, the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, a depth sensor.

In some embodiments, generating the inspection report comprises determining the one or more inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

In some embodiments, the description data is captured by a mobile computing device associated with a user and transmitted to one or more processors configured to control the machine learning model with or without user interaction.

In some embodiments, generating the inspection report comprises causing the machine learning model to determine one or more insurance underwriting estimates using at least one or more inventory attributes, the quality of structural components of the location, and the hazards in and/or around the location as inputs for the machine learning model.

In some embodiments, the method further comprises receiving adjustments to the inventory list and/or the interior and/or exterior condition information, and using the adjustments and corresponding inventory attributes, quality of structural components of the location, and/or hazards in and/or around the location, as input to (1) update the inspection report, and/or (2) retrain the machine learning model.

In some embodiments, the description data is time stamped, geo stamped, and/or user stamped.

In some embodiments, the interior and/or exterior condition information comprises a description of a spatial position of the location relative to potential natural hazards. In some embodiments, the description of the spatial position of the location relative to potential natural hazards and/or the potential natural hazards themselves are determined at least in part based on information from the external location information database.

In some embodiments, the inspection report is determined at least in part based on information from an external market information database.

Some aspects of the present disclosure relate to a computer readable medium storing instructions for generating an inspection report utilizing a machine learning model. The instructions cause one or more processors to perform operations comprising: receiving description data of a location, the description data generated via at least one of a camera, a user interface, an environment sensor, and an external location information database; generating an inventory list comprising a plurality of items at the location, utilizing the machine learning model, based on the description data, the inventory list further comprising inventory attributes associated with the plurality of items related to a context of the plurality of items at the location; determining, utilizing the machine learning model, based on the description data, interior and/or exterior condition information for the location, the interior and/or exterior condition information describing a quality of structural components of the location and/or hazards in and/or around the location; and generating, utilizing the machine learning model, based on the inventory list and the interior and/or exterior condition information, the inspection report for the location.

In some embodiments, the description data comprises one or more media types, the one or more media types comprising at least one or more of video data, image data, audio data, text data, user interface data, display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, a depth sensor.

In some embodiments, generating the inspection report comprises determining the one or more inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

In some embodiments, the description data is captured by a mobile computing device associated with a user and transmitted to one or more processors configured to control the machine learning model with or without user interaction.

In some embodiments, generating the inspection report comprises causing the machine learning model to determine one or more insurance underwriting estimates using at least one or more inventory attributes, the quality of structural components of the location, and the hazards in and/or around the location as inputs for the machine learning model.

In some embodiments, the operations further comprise receiving adjustments to the inventory list and/or the interior and/or exterior condition information, and using the adjustments and corresponding inventory attributes, quality of structural components of the location, and/or hazards in and/or around the location, as input to (1) update the inspection report, and/or (2) retrain the machine learning model.

In some embodiments, the description data is time stamped, geo stamped, and/or user stamped.

In some embodiments, the interior and/or exterior condition information comprises a description of a spatial position of the location relative to potential natural hazards. In some embodiments, the description of the spatial position of the location relative to potential natural hazards is determined at least in part based on information from the external location information database.

In some embodiments, the inspection report is determined at least in part based on information from an external market information database.

Some aspects of the present disclosure relate to a non-transitory computer readable medium having instructions thereon, the instructions configured to cause a computer to execute a multi-stage electronic model for predicting physical hazards at a location, the physical hazards changing over time and from location to location, each stage of the multi-stage electronic model being optimized based on a required computing capability and a maximum allowable processing time for a given stage to minimize overall computing resources and processing time for the multi-stage electronic model. The instructions causing operations comprising: receiving description data of the location, the description data generated via at least one of a camera, a user interface, an environment sensor, and an external location information database; predicting, with a first stage of the multi-stage electronic model, a potential hazard type based on the received description data, the potential hazard type comprising one potential hazard type of a set of predetermined potential hazard types, the first stage having a first configuration optimized for potential hazard type predictions based on the received description data; and predicting, with a second stage of the multi-stage electronic model, based on the predicted potential hazard type and the received description data, a physical hazard at the location, the second stage having a second configuration that is different from the first configuration, the second configuration associated with the predicted hazard type without regard for other potential hazard types, the second configuration optimized for predicting the physical hazard at the location once the hazard type is predicted by the first stage.

In some embodiments, predicting the potential hazard type comprises identifying objects and structures at the location by one or more of: object detection, semantic segmentation, instance segmentation, and panoptic segmentation, object tracking through multiple images, feature-matching, optical flow estimation, relative camera pose estimation, multi-view projection, non-maximum suppression, class-based suppression, and heuristic suppression.

In some embodiments, predicting the physical hazard comprises 3-dimensional reconstruction of the location using a Structure from Motion (SfM) algorithm, Multi-View Stereo (MVS), Simultaneous Localization and Mapping (SLAM), and/or depth estimation algorithms.

In some embodiments, the description data includes interior and/or exterior condition information about the location, wherein the interior and/or exterior condition information comprises a description of a geographical and/or spatial position of the location relative to potential natural hazards; and wherein the description of the geographical and/or spatial position of the location relative to potential natural hazards is determined at least in part based on information from an external location information database.

In some embodiments, the first and second stages of the multi-stage electronic model are trained with first and second training data, the first and second training data being different, the first training data comprising input-output training pairs associated with each potential hazard type in the set of predetermined potential hazard types, the second training data comprising input-output training pairs associated with only the predicted hazard type.

DETAILED DESCRIPTION

Figure 1:
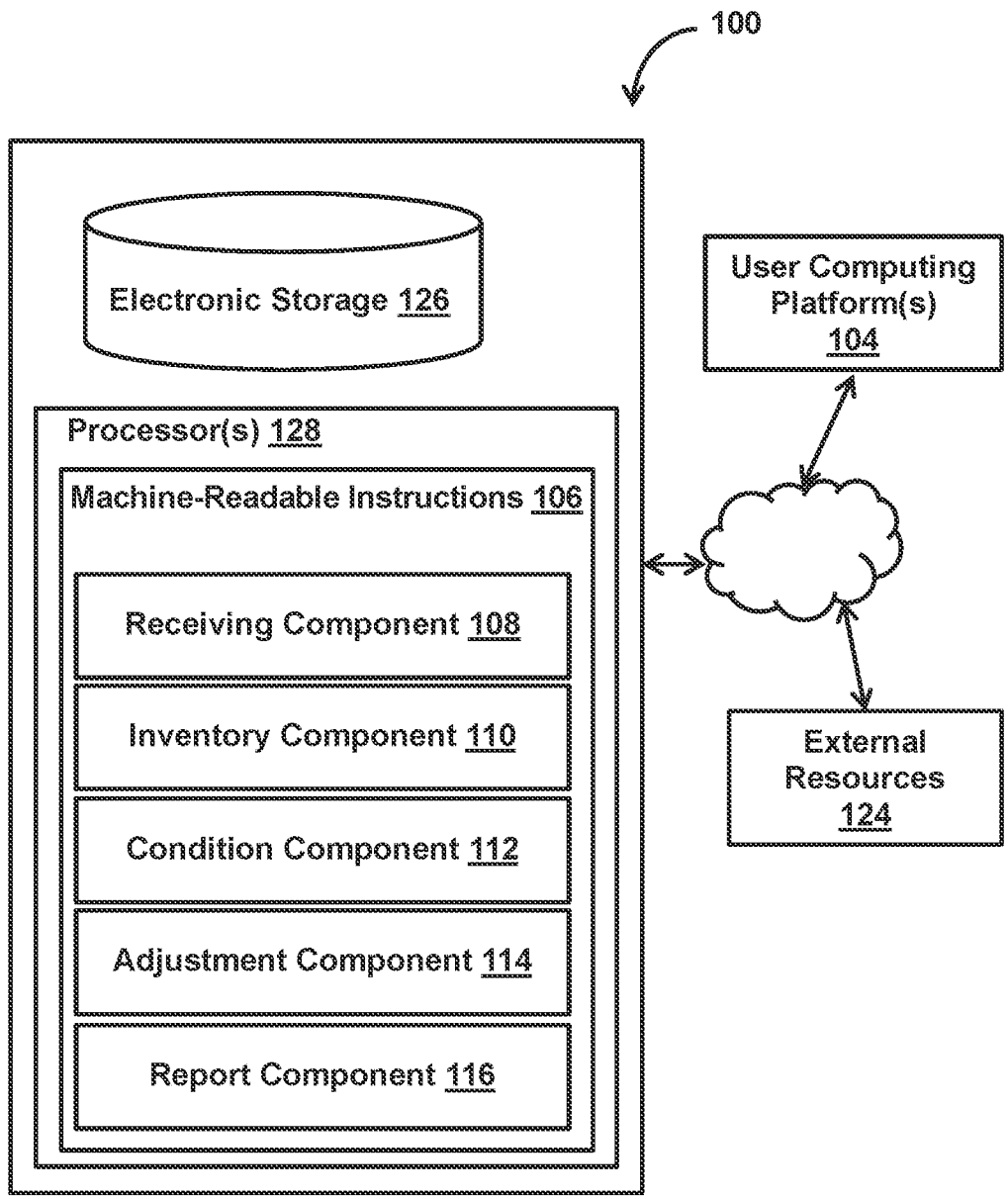
FIG. 1 illustrates a system for generating an inspection report (e.g., for insurance underwriting) utilizing one or more electronic models such as a machine learning model, in accordance with one or more embodiments.

Underwriting and pricing are important stages of the homeowner's insurance sales process as they determine whether an insurance carrier will assume the risk to write a policy and, if so, what annual premium the insured will be charged. Making the right decisions on both is paramount for an insurance company's balance sheet. Currently, many carriers rely on customer input to provide the requisite information for underwriting and pricing determinations. This approach is cheap for the carrier, but prone to errors in information collection. Alternatively, carriers might send agents out to do an in-person home inspection to collect necessary information. However, this approach is more expensive and time consuming for both the insurer and the homeowner. It is clear that insurance companies need accurate data to underwrite and price new policies and that it would be beneficial for all parties for this process to be easy and inexpensive.

The present systems and methods simplify this information gathering process. For example, given images and videos captured by the homeowner of their home's interior and exterior (note that other users and other structures are contemplated), the present systems and methods automatically generate a report of the home's (or other structure's) contents and factors that contribute to its risk profile, which can subsequently be used by insurance companies to evaluate new and existing policies.

The process of getting a property insurance quote (premium) today is a labor-intensive process. It may involve an onsite visit, for example. An individual seeking insurance may contact an insurance provider, and the insurance provider may then schedule an onsite inspection. An inspection agent typically makes a visit to the property to take note of: immediate hazards for the property (e.g., trees hanging over roof, expired water heater, stairs without railing, etc.); potential hazards for the property (e.g., area prone to natural disasters, property is on a hillside or close to the edge of a cliff, etc.); size measurements of the property (e.g., dimensions of the roof, rooms, etc.); various items including valuable contents of the property (e.g., electronics, art, furniture, etc.); a general condition of the property (e.g., well kept, messy, etc.); and/or other notes. The inspection agent shares their findings with the insurance provider to assess a risk factor for the property. The insurance provider then evaluates the inspection agent's findings and decides whether to provide a premium for the property, or to provide a list of recommended and/or necessary actions to put the property in an acceptable state to be considered for a premium.

Sometimes, an individual seeking insurance fills in online forms with property related information. In these situations, insurance companies primarily rely on consumer inputted text data from online forms to provide a quote for property insurance. To complete the underwriting process, insurance companies generally have to do the following: reference previous underwriting quotes, other information related to that property that is available from a database, and user provided information to provide a quote; make assumptions on various factors, for example, what type of content the consumer owns, its value, its type of structure, and its condition, among several others as there are limitations to the extent of information users can provide, and take all these into account to provide a quote; and/or perform other operations. This can cause costly inaccuracies for an insurance provider.

Prior attempts at automating these operations have not adequately addressed problems experienced by users (e.g., property owners or anyone else seeking insurance) or insurance providers (e.g., any entity that performs some type of underwriting function). The present systems, methods, and computer readable media, solve prior problems by accurately electronically predicting and/or otherwise determining items (e.g., contents and structures) and physical hazards at a location and generating an inspection report, and/or other operations. This is performed with one or more machine learning models and/or one or more multi-stage electronic (machine learning) models as described herein, for example. The model(s) are used for predicting physical hazards at a location, determining an inventory of items at the location, generating an inspection report, and/or other operations. The physical hazards and/or the items at the location may be changing over time and from location to location, for example, and whether or not something constitutes a physical hazard is often not well defined, such that these are not straightforward electronic predictions and determinations. The present systems, methods, and computer readable media facilitate making these accurate predictions and determinations with one or more electronic models optimized based on a required computing capability (e.g., costs associated with a large amount of computing capability may make a product commercially unreasonable) and a maximum allowable processing time (e.g., so that these determinations take fractions of a second instead of minutes, hours, or days to complete) to minimize overall computing resources and processing time.

Existing hazard identification systems are limited to simply identifying the presence or absence of objects that might indicate a hazard. The systems thus approach the problem of hazard identification as a binary decision based solely on one or more objects' presence in an environment. As such, these systems are limited in the information they use to inform the hazard identification, and are unable to take into account combinations of other factors, such as: spatial and/or geographic information of an environment or of one or more objects (e.g., a house's position relative to a known landslide hazard), the configuration of objects within a environment (e.g., a tree limb hanging over a roof), information about the material composition of objects or the environment (e.g., flammable newspapers stored on an open fireplace hearth), and other higher level information abstractions about a property. Furthermore, while some existing systems are able to identify the presence of certain types of objects, they are incapable of identifying the condition or quality of said objects, which can limit the usefulness of such systems to automatically determine if something poses a hazard without further user action or manual intervention. For example, a water heater by itself is not necessarily a hazard, but an old water heater may be.

Some embodiments according to the present technology provide a novel way of providing upfront, accurate underwriting estimates by using a deep learning/natural language processing electronic model (e.g., artificial intelligence (AI) comprising the processing components and/or the one or more electronic models described herein) powered system and/or other machine learning models. The present technology may make such estimates into a more interactive experience. Consumers and/or providers may adjust and/or annotate inspection reports, adding and/or removing specific items, etc. The interactive experience may also prompt the consumer to provide input that will improve the estimate, for example.

Some embodiments according to the present technology may provide the ability to perform targeted actions based on items predicted, determined, detected, and/or otherwise identified by machine learning and/or other algorithms (e.g., other AI) such as the one or more electronic machine learning models described herein. As an example, for insurance coverage purposes, the machine learning model(s) and/or other algorithms (e.g., other AI) may ask the consumer for a make, model, date of purchase, etc., for one or more detected items.

Some embodiments according to the present technology may include the ability to ask targeted questions automatically based on images and/or other data received by the system. As an example, for insurance coverage purposes, the system may ask what level of insurance a consumer wants (e.g., present value, replacement cost, etc.).

In some embodiments, the ability for consumers to correct and/or update inspection reports may be provided. For example, if a mirror were incorrectly detected as a window, consumers may interactively change the item name (as well as delete any reflections in the mirror that were mistakenly identified as items), and have it reflected in the premium. If a machine learning model detects an item that the consumer wants to exclude from the report (for example, if they plan on not insuring a certain item, or it was just a reflection in a mirror), they may remove the item and the report may update in real-time or near real-time.

Analysis from a machine learning model (e.g., the one or more processors and/or electronic models described herein, which also may be generally referred to as artificial intelligence or AI) may be used to predict the cost of insurance by, for example, detecting a number of items (objects), size and weight of items (objects), a location of items (objects, a home itself), a brand of items, hazards, etc., and translating this into cost. Insurance and/or other third party providers may further augment information sent by consumers to update a quote. Various determinations may be based on an inventory of items detected. The inventory of items may include information in addition to a list of objects. The inventory of items may include information related to a type of media used to record and/or input an item/object into the system (e.g., images, videos, voice recordings, etc.), attributes of a given item/object (e.g., as described herein), a location of the given item/object, whether the given item/object belongs to a set of related items/objects, hazards associated with a location, and/or other information.

FIG. 1 illustrates a system for generating an inspection report (e.g., for insurance underwriting) utilizing artificial intelligence (AI) such as a machine learning model, in accordance with one or more embodiments. In some embodiments, system 100 may include one or more servers 102. The server(s) 102 may be configured to communicate with one or more user computing platforms 104 according to a client/server architecture. The users may access system 100 via user computing platform(s) 104. System 100 utilizes information from cameras, depth sensors, microphones, accelerometers, Lidar, location sensors, inertial measurement unit (IMU) data (e.g., data collected from an accelerometer, a gyroscope, a magnetometer, a barometer, and/or other sensors), text data, questions asked by a human agent or a machine learning algorithm based on sent images, videos, previous answers as well as answers by the consumer on a mobile device (e.g., smartphone, tablet, and/or other mobile device that forms a user computing platform 104), and/or other information to determine an underwriting estimate, and/or other services. These examples are not intended to be limiting.

User computing platforms 104 may communicate digital media items to server 102. Digital media items may include one or more of digital photos, images, videos, audio, local digital media items, connected digital media items, and/or other digital media items. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

The server(s) 102 and/or computing platform(s) 104 may be configured to execute machine-readable instructions 106. The machine-readable instructions 106 may include one or more of a receiving component 108, an inventory component 110, a condition component 112, an adjustment component 114, a report component 116, and/or other components. Various other components are contemplated. For example, a launch indication component may be configured to receive an indication of a launch of an app or other messaging channel. As another example, one or more of components 108, 110, 112, 114, and/or 116 etc. may include sub-components related to other applications of the present systems and methods. In some embodiments, some or all of the components may be located in server(s) 102, in computing platform(s) 104, a combination of the two, and/or other computing devices. The machine learning work (e.g., the operations performed by one or more processors 128 and/or the one or more electronic models described herein) may be performed in one or more of the cloud, a mobile device, and/or other devices.

One or more of components 108-116 may cooperate with (e.g., send information to, receive information from, and/or other cooperation) and/or form some or all of the one or more electronic models described herein. Machine readable instructions 106 may be configured to cause server 102 (and/or other computing devices) to execute the one or more electronic models. The one or more electronic models may comprise machine learning and/or other artificial intelligence models. The one or more electronic models may comprise various networks, algorithms, equations, lookup tables, heuristics or conditions, 3D geometric models, and/or other models. In some embodiments, the one or more electronic models may include classification algorithms, neural networks, and/or combinations thereof.

The one or more electronic models may include a machine learning model that includes a deep neural net such as a convolutional neural network (CNN), recurrent neural network (RNN), long short term memory (LSTM) network, etc. However, the one or more electronic models are not limited to only these types of networks. The model(s) may be configured to read images either sequentially or as a batch and identify those it can recognize. Multiple different algorithms may be used to process one or more different inputs. As an example, besides object detection using a convolutional neural network, another different convolutional neural network may be used to classify the location of the user to be a type of a room such as a bathroom or kitchen. The output of these algorithms may be a 2D or 3D bounding box or a mask around the objects of interest, or in the case of audio, a text string that processes/translates the user voice input, etc., for example.

In some embodiments, the one or more electronic models may include a multi-stage electronic model for identifying objects, predicting physical hazards at a location, and/or for other purposes. The multi-stage model may comprise, for example, a classification algorithm (e.g., a first stage) that classifies a particular item or hazard into a certain category, and a trained neural network (e.g., a second stage) configured to predict or otherwise determine attributes of the item (e.g., as described below), whether or not the hazard is an actual hazard, and/or other information.

In some embodiments, the multi-stage electronic model may use one or more geometric 3D reconstruction frameworks such as Structure-from-Motion (SfM), Simultaneous Localization and Mapping (SLAM), and Multi-View Stereo (MVS) to create 3D models of a location that can be used in conjunction with object identifications in order to identify hazards. The objects may be identified by a machine learning stage in the multi-stage model from images and video frames of the location. Using information about the intrinsics of the camera (e.g., focal length and principal point) and its relative orientation in the 3D model (e.g., rotation and position) provided by a user or estimated via the geometric reconstruction framework, identified objects may be spatially localized in 3D to determine whether their relative position in the location informs a hazard. In some embodiments, the 3D model may be estimated by a machine learning model that is trained to predict a 3D model from a collection of images or video frames with associated camera information (e.g., intrinsics and extrinsics). The 3D model may be computed using a depth scanning device. The 3D model may be a CAD design from an external database or provided by a user, for example. In some embodiments, the 3D model may be input to a machine learning model to identify and localize objects at a location and subsequently determine if their configuration should be deemed hazardous. In some embodiments, a user may inspect the 3D model and/or other outputs of the multi-stage electronic model to measure spatial relationships between contents and structures to determine the presence of hazards.

The items and physical hazards described herein may change over time and from location to location. The one or more electronic models (e.g., each stage of the multi-stage electronic model in the example above) are optimized based on a required computing capability and a maximum allowable processing time for a given stage to minimize overall computing resources and processing time for the multi-stage electronic model. For example, optimizations may include determining a number of different stages, determining how to most efficiently arrange and/or reuse each stage (e.g., a process that is demanding both in terms of computation and memory requirements, such as feature extraction, is ideally performed only once such that its output is used as input by multiple stages within the architecture which otherwise would have been performed redundantly for each stage), determining which type of model (e.g., a classification algorithm, a neural network, etc.) to use for a given stage, how a given model should be trained (e.g., which data should be used to train that stage). Furthermore, optimizations may include determining how to categorize hazards in preliminary stage(s) (e.g., for stage 1) and subcategorize them in subsequent stage(s) (e.g., for stage 2); determining how much data should be gathered for each category to train the model; determining which neural network architecture produces the best results; determining which cost function should be used for training the model; determining how to split available data into training data, testing data, validation data, etc.; determining how to augment the data, for example, in a case where there is insufficient data available to train the model; determining how to minimize the confusion or maximize the distinction between categories with similar attributes; etc.

By way of a non-limiting example related to hazards (there are many other possible examples), the present one or more electronic models may be used for identifying, with a first stage of a multi-stage electronic model, vegetation such as trees in the vicinity of a dwelling (e.g., a potential hazard type) based on received description data (described below). The potential hazard type may comprise one potential hazard type (e.g., vegetation related hazards) of a set of predetermined potential hazard types (e.g., dwelling in a flood zone, old and/or damaged structural elements, old and/or hazardous appliances such as a water heater, items that are due for inspection and/or service, etc.) The first stage may have a first configuration (e.g., the first stage may comprise a classification algorithm) optimized (e.g., trained or otherwise configured with certain variables, weights, etc.) for potential hazard type predictions based on the received description data. In some embodiments, the categorization may be based on things such as items considered to be direct hazards (e.g., a propane tank); item attributes as hazards (e.g., stairs without a railing, swimming pool without an enclosure); an item made of a material in poor condition (e.g., a damaged wall); an inter-item spatial relationship (e.g., how close is a tree branch to the roof); a property location (e.g., if a property is within the vicinity of a natural hazard area); etc.

The present one or more electronic models may be used for actually predicting, with a second stage of the multi-stage electronic model, based on the predicted potential hazard type and the received description data, a physical hazard at a location. The second stage having a second configuration (e.g., a neural network) that is different from the first configuration (e.g., the classification model). The second configuration may be associated with the predicted hazard type without regard for other potential hazard types. The second configuration optimized (e.g., the neural network may be trained with specific training data—annotated images, videos, etc.) for predicting the physical hazard at the location once the hazard type is predicted by the first stage.

In this example, the first and second stages of the multi-stage electronic model are trained with first and second training data. The first and second training data are different. The first training data comprises input-output training pairs (described herein) associated with each potential hazard type in the set of predetermined potential hazard types. The second training data comprises input-output training pairs associated with only the predicted hazard type.

Returning to FIG. 1, receiving component 108 may be configured to receive description data (e.g., after capturing the description data for a location). In some embodiments, the description data comprises one or more media types. The one or more media types comprise at least one or more of video data, image data, audio data, text data, user interface/display data, and/or sensor data. In some embodiments, the description data is time stamped, geo stamped, user stamped, and/or annotated in other ways.

The scanning may be performed by one or more of a camera, a computer vision device, an inertial measurement unit, a depth sensor, and/or other sensors. In some embodiments, scanning includes data generated by video and/or image acquisition devices, and/or voice recording devices, a user interface, and/or any combination thereof. In some embodiments, the description data is generated via a user interface (e.g., of a user computing platform 104), an environment sensor (e.g., that is part of a user computing platform 104 and/or other computing systems), an external location information database (e.g., included in external resources 124), and/or other sources of information. The data may be generated responsive to a user request, and/or automatically by the system (e.g., without initiation by a user). In some embodiments, the description data is captured by a mobile computing device (e.g., a user computing platform 104) associated with a user and transmitted to one or more processors 128 (e.g., receiving component 108) with or without user interaction.

In some embodiments, receiving description data comprises receiving sensor data from one or more environment sensors. The one or more environment sensors comprise a global positioning system (GPS) sensor, an accelerometer, a gyroscope, a barometer, a microphone, Lidar, a depth sensor, and/or other sensors.

The received data provides a description of the location (e.g., description data). The description data may include interior and/or exterior condition information about the location, and/or other information. As an example related to hazards, the interior and/or exterior condition information may comprise a description of a geographical and/or spatial position of the location relative to potential natural or unnatural hazards. The description of the geographical and/or spatial position of the location relative to potential hazards may be determined at least in part based on information from an external location information database (e.g., included in external resources 124), for example. A hazard may be and/or include anything that increases a risk associated with a location from the perspective of an insurance provider. Some example of hazards are damage to the property, faulty/dangerous contents, unstable structure, potential risks due to the location of the property (e.g., nearby objects that could inflict damage, common natural disasters), potential risks due to harm inflicted by the property to others (e.g., falling from a roof, falling into a pool, tripping on a cracked walkway, no safety rails are present for a deck or a balcony), etc.

Receiving component 108 may be configured such that graphical user interfaces, such as those provided by native applications on mobile devices or browser applications (e.g., by computing platforms 104), may be controlled to enable interactive instructions for the user during the capture process. These graphical user interfaces (controlled by receiving component 108) can also enable a user to provide further text, audio, image, and video data in support of the captured images and videos. Data from additional sensors, including GPS, accelerometers, gyroscopes, barometers, depth sensors, Lidar, microphones, and/or other sensors, can also be used for capturing properties of the surrounding environment.

By way of a non-limiting example, a user (and/or system 100 without the user) can use cameras, user interfaces, environmental sensors, external information databases, and/or other sources to acquire data about a location, its contents and structures, and its potential hazards. The information collected can subsequently be input to automated processes (e.g., the one or more electronic models and processor functionality described herein) for further identifying contents, structures, and hazards in order to generate an inspection report (described below).

One example method of data capture involves capturing video recordings. These recordings may be processed (e.g., by the one or more electronic models and/or components 108-116) in real time during the capture or captured in advance and processed at some later point in time. During a real time video capture, a graphical user interface (e.g., controlled by receiving component 108 and presented by a computing platform 104 associated with the user) can provide interactive instructions to the user to guide them through the process. The one or more electronic models (e.g., a machine learning model) and/or processing components processing the real time video stream can identify if certain contents or structures require additional captures by the user. When this occurs, the user may be immediately prompted to capture additional images or videos of specific aspects of the property, such as manufacturing labels, brand logos on appliances, and purchase receipts, among other attributes. When a user captures a video in advance and later uploads it to a server through the graphical user interface, it can subsequently be processed by the same electronic (machine learning) model(s) to obtain an inventory of identified contents, structures, and hazards for the property as well as a list of property aspects that need further documentation. Audio and other sensor data may be captured by the user as well, providing more context for the image and video recordings. The same data capture flow may be used when a user captures a collection of still images of the property, including general images of the property as well as close ups of items of interest that might be necessary for evaluating a property. Additionally, the real time video stream capture format may be incorporated as part of a collaborative process with an insurance representative who can provide interactive guidance to the user through a graphical user interface.

Inventory component 110 may be configured to generate an inventory list comprising a plurality of items at the location, utilizing the one or more electronic models (e.g., a one or more stage machine learning model), based on the description data and/or other information. The inventory list comprises inventory attributes associated with the plurality of items related to a context of the plurality of items at the location. In some embodiments, the inventory attributes comprise locations of the items at the location, a quality of items at the location, brand names of the items at the location, materials of the items at the location, damage to items at the location, age of the items at the location, condition of the items at the location, dimensions of the items at the location, values of the items at the location, and/or other information about the items at the location.

Condition component 112 may be configured to determine, utilizing the one or more electronic models (e.g., the one or more stage machine learning model), based on the description data, interior and/or exterior condition information for the location. The interior and/or exterior condition information describes a material and/or quality of structural components of the location, hazards in and/or around the location, and/or other information. The interior and/or exterior condition information also comprises a description of a geographic and/or spatial position of the location relative to potential (natural and/or unnatural) hazards. In some embodiments, the description of the spatial position of the location relative to potential natural hazards may be determined at least in part based on information from an external location information database (e.g., included in external resources 124).

In some embodiments, a workflow may include a user launching an app (e.g., provided/controlled by processors 128) or another messaging channel (SMS, MMS, web browser, etc.) and scanning a location (e.g., a home and/or another location) where camera(s) data and/or sensor(s) data may be collected and received by receiving component 108. The app (e.g., inventory component 110 and/or condition component 112) may use the camera, IMU, depth sensor data, etc. to collect and fuse data to detect surfaces, objects, hazards, etc. One or more machine learning algorithms (e.g., a machine learning model comprising a neural network etc.) specifically trained to identify items, hazards, etc. (e.g., walls, ceiling, floor, furniture, wall hangings, appliances, overhanging trees, stairs without a railing, etc.), and/or other characteristics may be used.

As a non-limiting example of the functionality of inventory component 110 and/or condition component 112, images and videos captured of the location may be processed by inventory component 110, condition component 112, and/or one or more electronic (e.g., machine learning) models to identify different contents and structures (e.g., items) present. This may include separating different contents and structures into different classes, for example. In some embodiments, these electronic (machine learning) models may comprise one or more implementations of the class of 2-dimensional recognition algorithms comprising object detection, semantic segmentation, instance segmentation, and panoptic segmentation. If the images are ordered, such as frames sampled from a video, these electronic models may also comprise one or more implementations of the class of tracking algorithms comprising single- and multi-object tracking, feature-matching methods, optical flow estimation, relative camera pose estimation, and multi-view projection.

The outputs of these electronic models may be post-processed to suppress any duplicate recognition. Duplicates may be identified and removed via the class of duplicate suppression algorithms comprising non-maximum suppression, class-based suppression, and heuristic suppression, such as for duplication that could occur due to properties of contents and structure in the physical scene such as reflectance in windows, mirrors, and televisions. Some of these duplicates may originate from objects going out of camera view and coming back in again, such as when users record items multiple times. These duplicates may occur across multiple different images within a collection of images. They may be identified using machine learning methods such as similarity matching and object re-identification. There are other types of duplicates that may occur in the same image, for example, a machine learning model may create multiple annotations around an image region that represents one item. After post-processing, the contents and structures may be reviewed, edited, and added to by a user through a user interface (e.g., that is part of a user computing platform 104).

Images of manufacturing labels, purchase receipts, and other natural language media that are acquired during the data capture process may be processed (by inventory component 110 and/or condition component 112) using an optical character recognition (OCR) algorithm. These OCR methods may be used to identify information such as serial numbers, installation and service dates, and material types, among other pertinent data.

Contents and structures (e.g., items) that have been identified from the description data may be further processed by inventory component 110, condition component 112, and/or the one or more electronic models to identify materials (e.g., of identified items) and conditions (e.g., used, new, damaged, not damaged, etc.) to better indicate their value, risk, and/or other properties. This operation may be concurrent with other operations, for example such that the materials and conditions (e.g., attributes) are determined as part of the same process (e.g., by the same one or more electronic models) that identifies contents and structures. Alternatively, this operation may be subsequent to previous operations, such that contents and structures are identified first (e.g., using a first stage of a model), and then analyzed for material and condition (e.g., using a second stage of a model).

The materials that comprise the identified contents and structures (e.g., items) may be identified through the use of image classification, object detection, semantic segmentation, instance segmentation, panoptic segmentation, and/or other operations. For example, a generic kitchen countertop may be detected in an image and its material may subsequently be determined using an image classification algorithm on a cropped image of the detected countertop. Alternatively, different versions of objects, divided into different classes of semantic labels based on material composition, may be explicitly detected and/or segmented in a single pass. For example, the aforementioned countertop may be identified all at once as a "stone countertop" by a machine learning algorithm. Building materials, such as brick, concrete, adobe, stucco, etc. may also be identified without being associated with specific classes of contents or structures in the image. For example, one or more electronic models may be used to identify brick or wood material in an image, irrespective of the object it comprises.

The conditions of contents and structures (e.g., items) may also be identified using image classification, object detection, semantic segmentation, instance segmentation, panoptic segmentation, and/or other operations. Similar to materials, the condition of contents or structures can either be inferred sequentially, first identifying the class of contents or structure and subsequently classifying its condition, or concurrently, wherein classes of detections or segmentations include condition qualifiers, such as "damaged window" or "couch."

By way of another non-limiting example of the functionality of inventory component 110 and/or condition component 112, this time related to hazards (e.g., part of the interior and/or exterior condition information described above), system 100 is configured to identify aspects of a location that might impact an insurance company's underwriting and pricing decision-making. Heuristics informed by domain knowledge may be used to determine whether any of the identified contents and structure (e.g., items) or their conditions or material composition indicate a potential hazard.

Contents and structures (e.g., items) may be the source of immediate imminent, and/or other hazards for the property. For example, hazards may include direct hazards such as trampolines, propane tanks, etc. As another example, hazards may include more indirect hazards such as vegetation hanging near or above the dwelling, stairs without safety rails, and swimming pools without enclosures. There are many other possible examples of these and other types of hazards. Geometric methods and machine learning methods may be used to identify these hazards, as well as hazards due to poor condition or materials for contents and structures. For example, insurance companies may have a specific interest in objects that are in poor condition and thus pose a hazard to the property, such as water heaters and electrical panels (there are many other possible examples). The condition indicators described previously may be used to highlight certain identified items as potential risks.

Structural hazards are also of interest to insurance companies. Using multiple views of a captured scene, 3-dimensional reconstruction algorithms such as Structure from Motion (SfM), Multi-View Stereo (MVS), Simultaneous Localization and Mapping (SLAM) and deep learning algorithms for depth estimation and 3-dimensional reconstruction may be used to determine 3-dimensional information about the location (e.g., a home) and its surrounding area. In conjunction with the contents and structures (items) previously identified, this 3-dimensional information may be used to identify hazards such as external object contact hazards (e.g. nearby trees that pose a hazard to the integrity of structure), falling hazards (e.g. overhanging branches), roof-related hazards (e.g. poor drainage, particularly steep roofs), and/or other hazards.

Objects near and above a dwelling, for example, may be identified as a hazard if they come within a certain distance of the dwelling. An example of this comprises surrounding vegetation such as trees that are nearby or in contact with the dwelling that have the potential of leaving debris or falling and damaging the dwelling. This hazard identification may be implemented by identifying 3-dimensional bounding boxes for the dwelling and any surrounding objects on the 3-dimensional model, and checking for overlaps between these bounding boxes. These bounding boxes may be manually created by a user or automatically identified through the use of one or more 3-dimensional object detection models. The dwelling's 3-dimensional bounding box may be adjusted by the user (e.g., via a user interface controlled by inventory component 110 and/or condition component 112, but displayed on a user computing platform 104) to specify a larger zone for identifying surrounding external objects as hazards.

Roof slopes, as another example, may be identified as hazardous if the roof slope is too steep or too shallow. Steepness thresholds may be obtained by inventory component 110 and/or condition component 112 from one or more external databases that are part of external resources 124, for example. A very steep roof slope may pose a falling hazard for repair and inspection work. Conversely, a shallow roof slope may pose a risk if snow, water, or debris accrues on it and the supporting structure is too weak. Roof slope may be computed using plane segmentation and surface normal estimation algorithms. These may be implemented using geometric techniques such as vanishing point estimation, epipolar geometry, and planar homographies. Plane segmentation and surface normal estimation may also be performed using machine learning models such as neural networks. Users may also provide information delineating the roof through a graphical user interface.

Other potential hazards that may be automatically predicted, identified, and/or otherwise determined based on the description data (e.g., captured visual media as well as information from other sensors like GPS) include hazards related to a property locality and/or proximity to disaster-prone regions. For example, structural instability may be visually inferred from images by estimating attributes such as the slant of a house frame or atypical structural support that may be indicated by nonlinear or non-parallel lines extracted along the house structure (e.g., with inventory component 110, condition component 112, and/or one or more electronic models). Examples of potential risk-mitigation can also be detected from the captured media, such as built-in alarm systems, security cameras, smoke detectors, fire sprinklers, nearby fire hydrants, lighting rods, and other systems designed to reduce the risk of theft or large-scale damage. GPS information may be used to identify if a location falls within a hazardous zone, such as areas known for flooding, fires, landslides, weather-related wear, and other natural disasters. Other location-based information about a location can also be sourced from external databases (e.g., external resources 124) using this GPS information in support of the information inferred from the data capture.

Adjustment component 114 may be configured to receive adjustments to the inventory list and/or the interior and/or exterior condition information. Adjustment component 114 may be configured to use the adjustments and corresponding inventory attributes, quality of structural components of the location, and/or hazards in and/or around the location, as input to update the inspection report, to retrain the one or more electronic models (e.g., a machine learning model that forms a specific stage).

In some embodiments, adjustment component 114 may be configured to cause one or more components (e.g., a display) of a user computing platform 104 ask targeted questions based on images/videos sent by the user to perform further analysis (as described in the examples provided herein).

Adjustment component 114 may be configured such that users may manually select items that inventory and/or condition components 110 and/or 112 have not identified (e.g., a small fragile item the user wants to insure, etc.) or add corrections to any possible mistakes made by the electronic model (e.g., the wall detected also contains some surface area of the ceiling or floor, two refrigerators were detected when there is only one refrigerator in a house, etc.). Users may add and remove items from an inspection report (described below). In some embodiments, adjustment component 114 is configured to cause the one or more machine learning models described herein to learn from human corrections (user or another human reviewer).

Report component 116 may be configured to generate an inspection report and/or other output. Report component 116 may generate, utilizing the one or more electronic models (e.g., a machine learning model), based on the inventory list and the interior and/or exterior condition information, the inspection report for the location. In some embodiments, generating the inspection report comprises determining the one or more inventory attributes (e.g., in cooperation with inventory component 110), listing some or all of the attributes in the inspection report, and/or other operations. In some embodiments, generating the inspection report comprises causing the one or more electronic models (e.g., a one or more stage machine learning model) to determine one or more insurance underwriting estimates using at least one or more inventory attributes, the quality and/or material composition of structural components of the location, the hazards in and/or around the location, and/or other information as inputs for the one or more electronic models. In some embodiments, the information in the inspection report may be determined at least in part based on information from an external market information database (e.g., a database included in external resources 124 that provides market insurance rates).

In some embodiments, a consumer app (e.g., provided by processors 128 on a user computing platform 104) working along with a backend infrastructure (e.g., report component 116 in server 102) may provide an inspection report to a user.

In some embodiments, an inspection report may include one or more itemized lists. These itemized lists may include costs based on items in and/or around a location, a square footage of the location, hazards in and/or around a location, a size, shape, or other attributes of the items, a spatial and/or geographic position of a location, and/or other items. In some embodiments, adjustment component 114 may be configured such that users may review inspection reports and/or make changes if desired. Inspection reports may be updated (e.g., by report component 116) in real-time or near real-time. Once an inspection report and/or an associated insurance underwriting quote looks acceptable, report component 116 may be configured such that a user may purchase insurance from the app.

By way of a non-limiting example, after collecting and processing the description data about a location by components 108-114 described above, an inspection report may be generated by report component 116, which aggregates and distills information into key details needed by an insurance provider. This inspection report can include details about the contents, structures, and hazards that were automatically identified, provided by the user, or referenced from one or more external information databases. Aspects of the property that the inspection report can cover include the condition of the interior and exterior of the property, roof, and plumbing, as well as the condition of any appliances, water heaters, electrical panels, and HVAC units, among other things.

In describing FIG. 1, the term "component" was used to aid the reader's understanding of the functionality of processor(s) 128. Different functional components 108-116 were utilized to segregate different aspects of the functionality to make the functionality easy to follow for the reader. It should be noted that the different components are simply used to refer to different portions of machine readable instructions 106 that cause processor(s) 128 to perform various operations.

The following descriptions of the various figures describe additional aspects of one or more components of system 100 shown in FIG. 1, and/or the operations performed by these components. The following descriptions often refer to functional "modules". One or more of these functional modules may be formed by one or more of the components described above, and/or portions of these one or more components. The term "module" is used again simply to aid the reader in understanding the different functions performed by processor(s) 128 as caused by machine readable instructions 106. The modules described below (e.g., the different combinations of machine readable instructions 106 that make up components 108-116) may enhance the reader's understanding of the present systems and methods by describing additional aspects of one or more components of system 100 shown in FIG. 1, and/or the describing the operations performed by these components in a slightly different way (e.g., but they are still describing the same present systems and methods).

Figure 2:
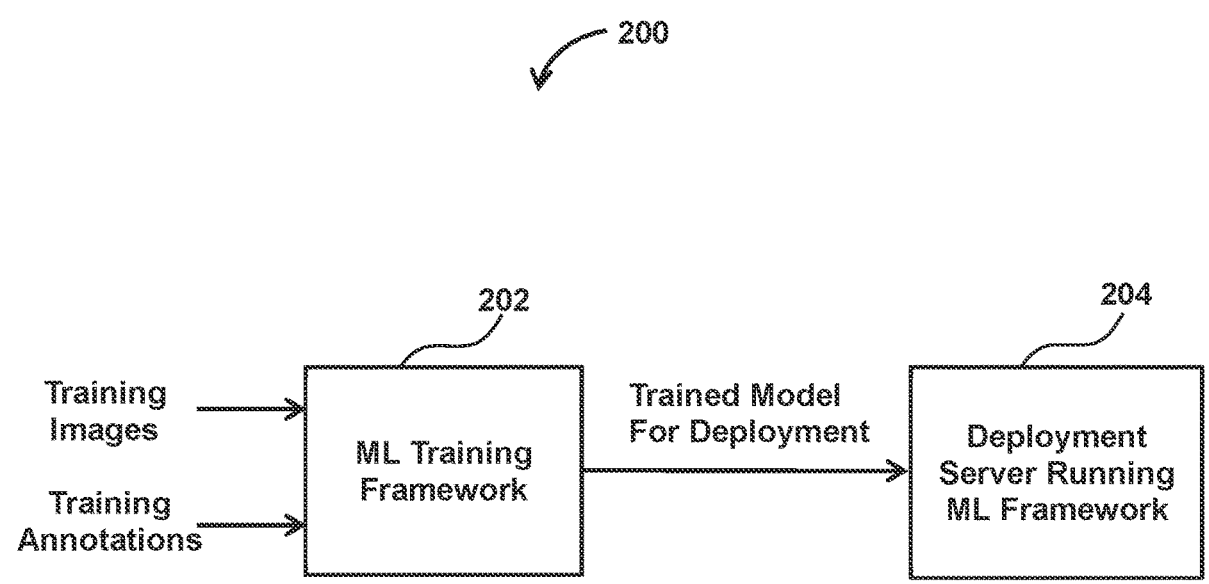
FIG. 2 illustrates a machine learning (ML) (e.g., an artificial intelligence (AI)) model that may be trained to recognize items at a location, interior and/or exterior condition information including hazards, and/or other information, in accordance with one or more embodiments.

FIG. 2 illustrates a machine learning (ML) (e.g., one or more electronic machine learning models) artificial intelligence model 200 that may be trained to recognize items at a location, interior and/or exterior condition information including hazards, and/or other information, in accordance with one or more embodiments. Model 200 may form some or all of inventory component 110 (FIG. 1) and/or condition component 112 (FIG. 1), for example. Multiple training images with items, hazards, etc. that need to be detected may be presented to an artificial intelligence (AI) framework 202 for training. Training images may contain non-items such as walls, ceilings, carpets, floors, and/or other non-objects; non-hazards; and/or other information. Each of the training images may have annotations (e.g., location of items in the image, coordinates, and/or other annotations) and/or pixel wise classification for objects, walls, floors, surfaces, interior (hazardous and non-hazardous) conditions, exterior (hazardous and non-hazardous) conditions, and/or other training images. Responsive to training being complete, the trained model (and/or one or more trained models) may be sent to a deployment server 204 (e.g., server 102 shown in FIG. 1) running a machine learning (e.g., AI) framework. It should be noted that training data is not limited to images and may include different types of input such as audio input (e.g., voice, sounds, etc.), user entries and/or selections made via a user interface, scans and/or other input of textual information, and/or other training data. The models, based on such training, may be configured to recognize voice commands and/or input, textual input, etc.

The deployment server 204 may be a standalone server and/or a module that may be deployed as part of an app in a user's smartphone, tablet, and/or other personal computing device, in accordance with one or more embodiments.

Figure 3:
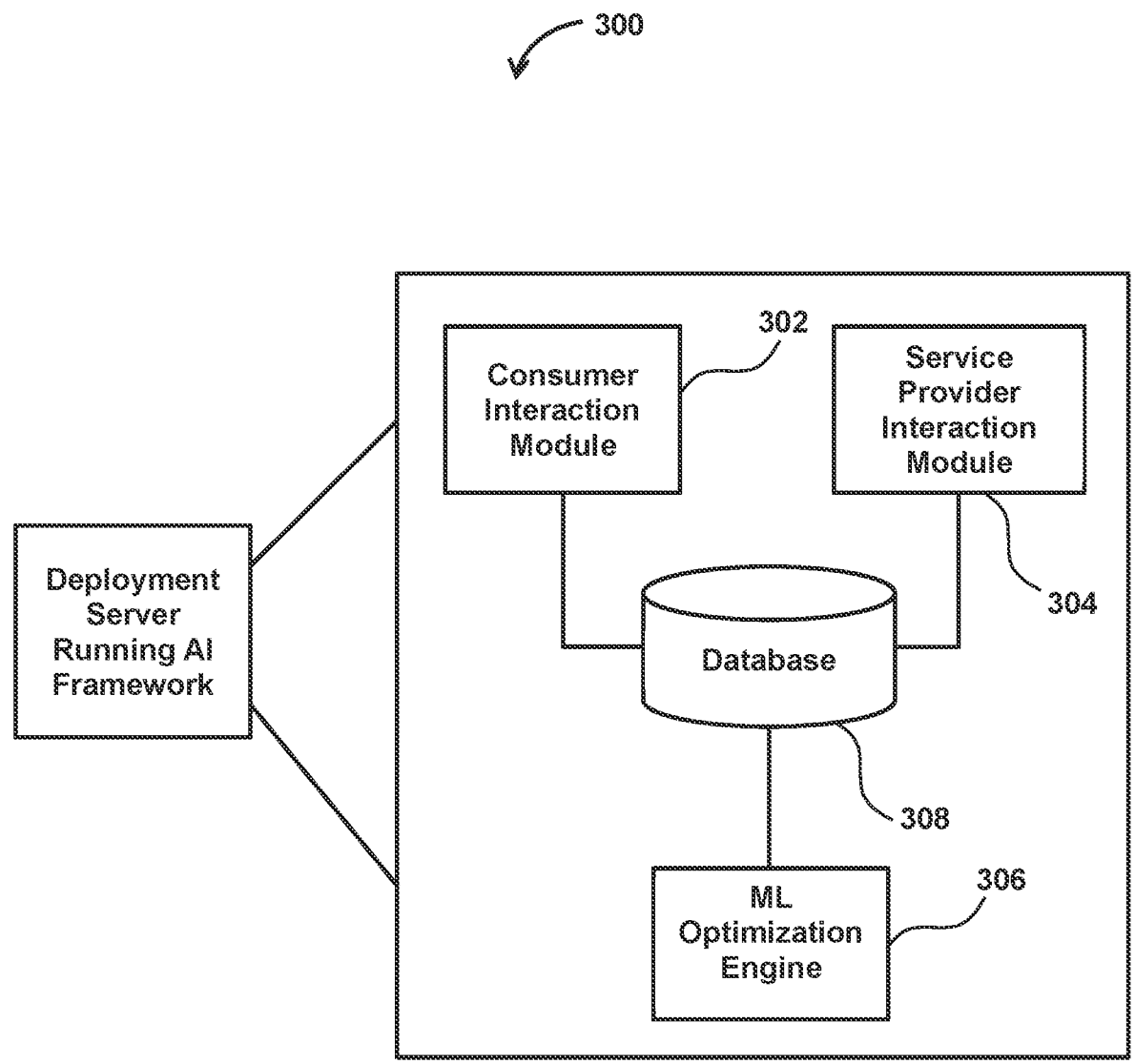
FIG. 3 illustrates an exemplary system wherein a deployment server running a machine learning (ML) (e.g., an AI) framework may include a consumer interaction module, a service provider interaction module, a database, and a machine learning (e.g., an AI) improvement engine, in accordance with one or more embodiments.

FIG. 3 illustrates details of how a deployment server 300 (e.g., server 102 shown in FIG. 1) running an machine learning (e.g. AI) framework may be architected. It may include one or more of a consumer interaction module 302, a service provider interaction module 304, a machine learning (e.g., an AI) optimization engine 306, a database 308, and/or other elements.

The consumer interaction module 302 (e.g., formed by receiving component 108 and/or other components shown in FIG. 1) may ingest data from a consumer, store the data in database 308 (e.g., electronic storage 126 shown in FIG. 1), analyze the data with machine learning (e.g., AI) models (e.g., inventory component 110, condition component 112, and adjustment component 114 shown in FIG. 1) for processing, and possibly communicating a quote back to a consumer (e.g., report component 116 shown in FIG. 1). The consumer interaction module 302 may ingest one or more of text, videos, pictures, audio, and/or other information from a user.

In some embodiments, the service provider interaction module 304 (e.g., formed by receiving component 108 and/or other components shown in FIG. 1) may serve as an interface to allow service providers (e.g., insurance underwriters) to review information from consumers and machine learning (e.g., AI) analysis (e.g., from the components of processors 128 and/or the one or more electronic models described above), make corrections if needed, and communicate with a user. The provider interaction module 304 may have the capability for a service provider to review an inspection report, send it back to the user through the appropriate messaging channel, or export to pdf and send it via another channel.

The machine learning (e.g., AI) optimization engine 306 (e.g., portions and/or all of adjustment component 114 and/or report component 116 shown in FIG. 1) may combine the original analysis output from the one or more machine-learning models with any changes made by a consumer, service provider, or dedicated human reviewer and provide feedback to the machine learning framework to improve the trained model(s). The machine learning optimization engine 306 may also host the machine learning framework which runs multiple machine learning models to be used on the data sent from the consumer as well as a service provider.

Figure 4:
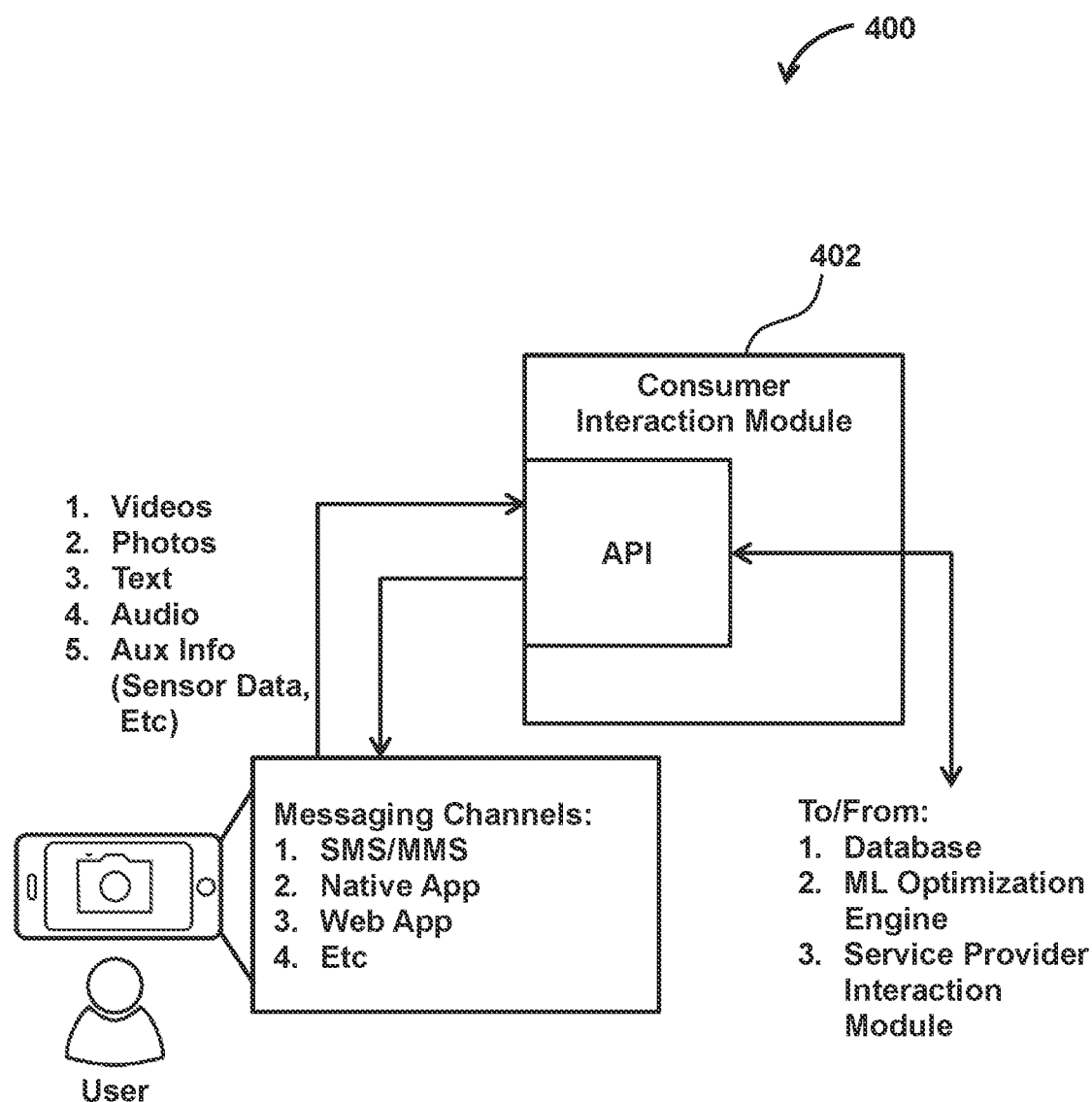
FIG. 4 illustrates an exemplary system wherein a user may send and receive information to/from a consumer interaction module in a deployment server running a machine learning (e.g., an AI) framework, in accordance with one or more embodiments.

FIG. 4 illustrates an exemplary system 400 (e.g., similar to and/or the same as system 100 shown in FIG. 1) wherein a user sends information to a consumer interaction module running on a deployment server 402 (e.g., server 102 shown in FIG. 1). The user's app or another messaging channel (SMS, MMS, web browser, etc.) may record camera frames, sensor (IMU) information, and/or other information including text data (answers to questions asked by a human agent or targeted questions asked by a machine learning (e.g., AI)

algorithm based on data that was already sent). Items, hazards, and/or other information may be tracked on the user's smartphone, tablet, and/or other personal computing device to send the relevant camera frames to the deployment server 402. The deployment server 402 (e.g., via processing modules and/or components formed by portions and/or all of receiving component 108 and/or inventory component 110 shown in FIG. 1) may use the camera frames and detect items, hazards, etc., in the camera frame. The deployment server 402 (e.g., through modules and/or components 108 and/or 110) recognizes and determines attributes of items through other computer vision techniques leveraging the sensors (e.g., IMU). As output the deployment server 402 may generate lists of detected items, hazards, etc., and/or detected non-items and non-hazards, as well as any attribute information. The deployment server may reside on-device (e.g., on server 102 and/or a user computing platform shown in FIG. 1) or the functionality may be split between an on-device server (e.g., server 102) and a server in the cloud.

Figure 5:
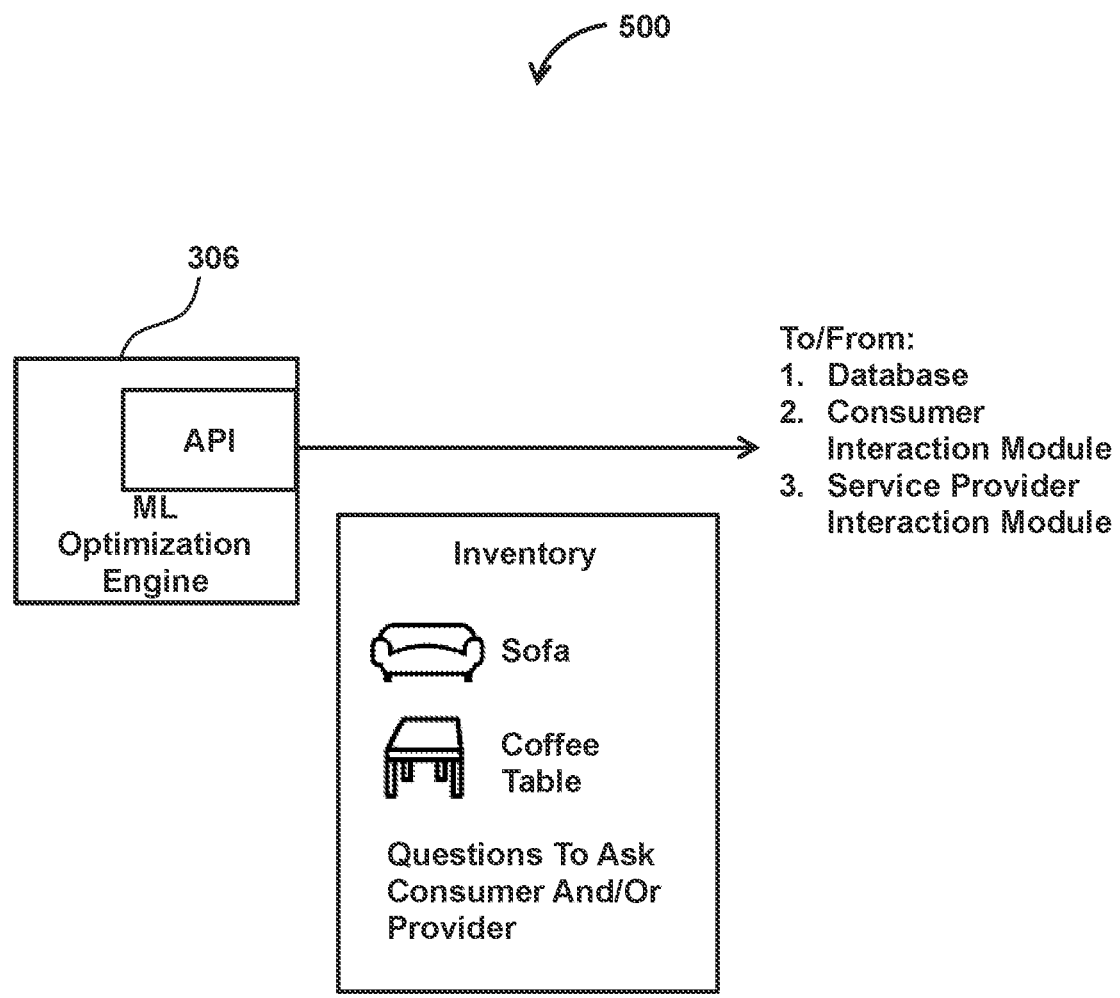
FIG. 5 illustrates an exemplary system wherein the machine learning (e.g., AI) optimization engine may output detected objects and other non-objects with various attributes (size, dimensions, locations, surface area, etc.) (and may create an inventory), as well as follow-up questions to ask of a consumer(s) and/or service provider(s), in accordance with one or more embodiments.

FIG. 5 illustrates an exemplary system 500 (e.g., similar to and/or the same as system 100 shown in FIG. 1) wherein detected items may be used to create an inventory, characteristics information for detected items, as well as a list of questions that the machine learning (e.g., AI) optimization engine (e.g., adjustment component 114 and/or report component 116 as described above related to FIG. 1) may need to provide more accurate data to the service provider or user (for example, questions on the pictures sent by the user or follow up questions based on past responses). This may be facilitated by a question answering component (not shown for purposes of clarity) which can reside in the machine learning optimization engine or the consumer interaction module. The inventory with the request for additional inputs may be sent to the user or to a service provider.

Figure 6A:
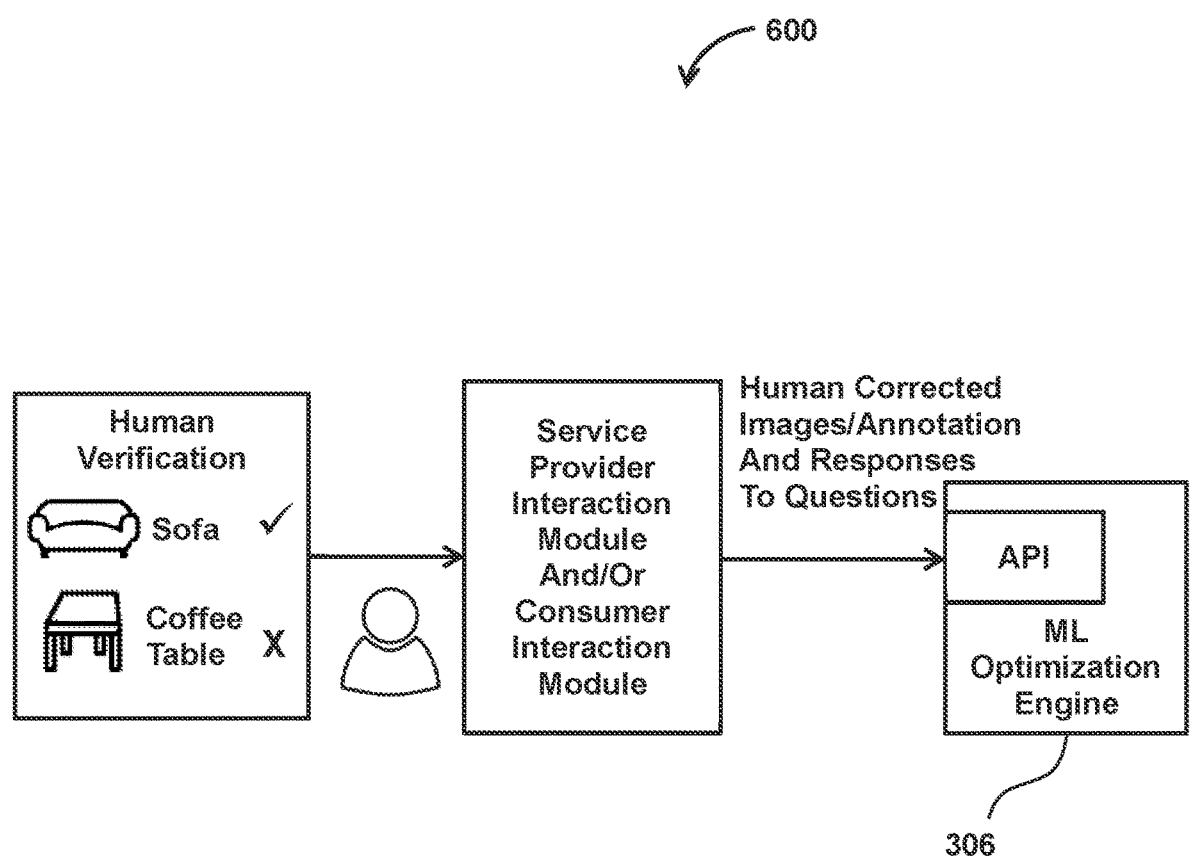
FIG. 6A illustrates an exemplary system where the output of the machine learning (e.g., AI) optimization engine is optionally human-verified and fed back into the machine learning optimization engine for better performance, in accordance with one or more embodiments.

FIG. 6A shows a system 600 (e.g., similar to and/or the same as system 100 shown in FIG. 1) and how the inventory items may be optionally human verified, in accordance with one or more embodiments. During a human verification step, any mistakes (e.g., by inventory component 110, condition component 112, and/or the one or more electronic models described above related to FIG. 1) may be corrected and/or the training framework may be updated with the updated images for training. The human verification may happen on end consumer devices where the user may correct the misdetections or in the cloud where a different human operator or service provider may issue the corrections. The human verification may include human corrected images, annotations, translations, interactive quote changes, added text, user interface inputs, and/or other information. The output may be an updated inventory items list, an updated hazards list, etc. The corrections may be sent back to the machine learning model (e.g., the one or more electronic models and/or other AI) for further processing (e.g., retraining).

Figure 6B:
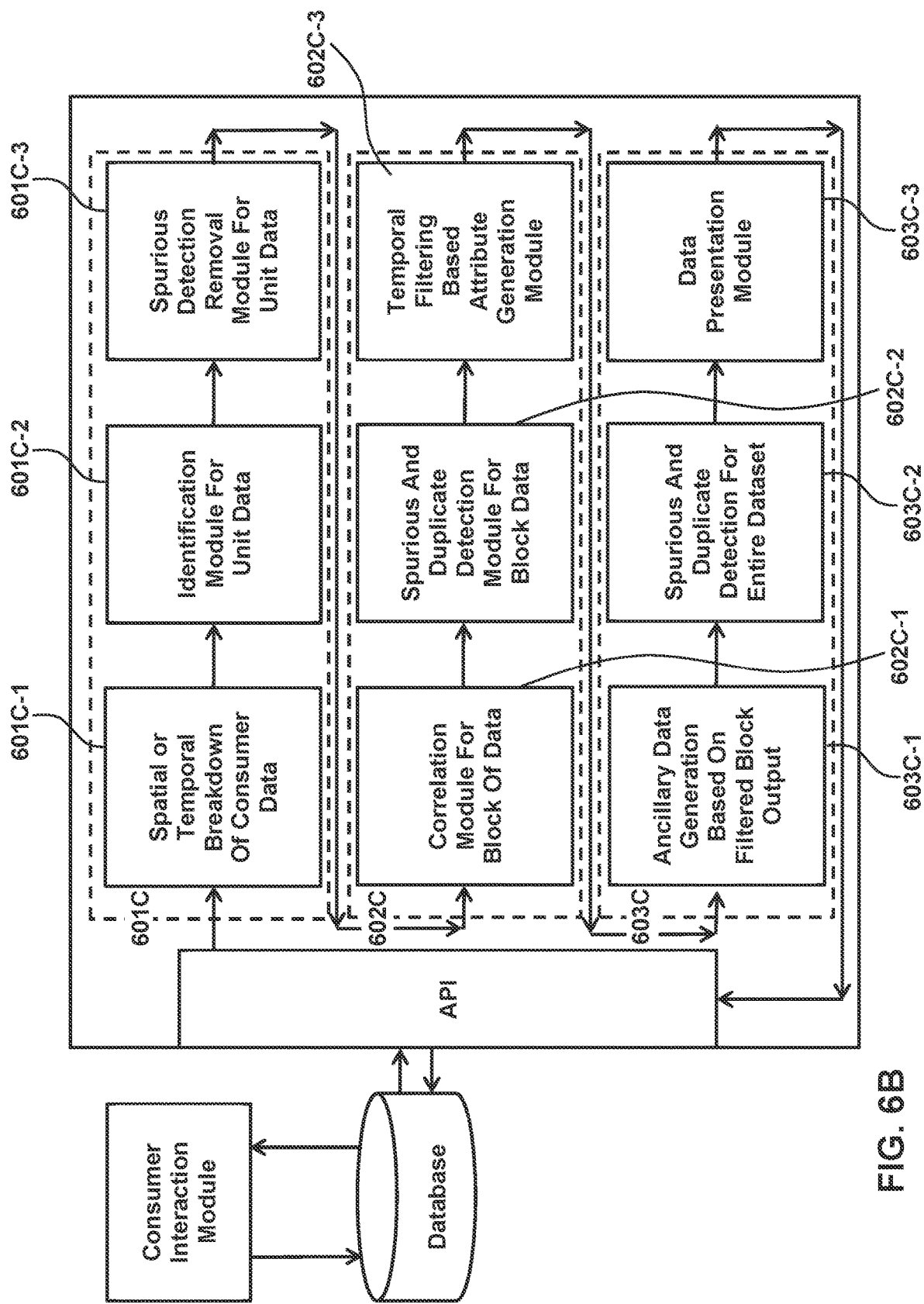
FIG. 6B illustrates an exemplary embodiment of artificial intelligence (AI) (e.g., one or more electronic (machine learning) models), in accordance with one or more embodiments.

FIG. 6B illustrates an exemplary embodiment of machine learning (AI) (e.g., processors 128 shown in FIG. 1 and/or the one or more electronic (machine learning) models described herein), according to one or more embodiments. This may include natural language processing algorithms, machine learning algorithms, neural networks, regression algorithms, and/or other artificial intelligence algorithms and electronic models. The machine learning described related to FIG. 6B may be representative of the descriptions of machine learning and/or other AI given elsewhere in this disclosure. At an operation 601c-1, FIG. 6B illustrates how the description data such as video or audio (e.g., provided by a user such as a consumer) is divided into smaller segments (units) using spatial, and/or temporal constraints as well as other data such as context data. For example, a video may be divided into multiple frames and poor quality images with low lighting and/or high blur may be filtered out. Similarly, an audio input may filter out segments comprising background noise and create units of audio where a speaker (e.g., the consumer) is actively communicating.

At an operation 601c-2, a machine learning algorithm such as a deep neural network comprising a convolutional neural network and/or a recurrent neural network is used to detect items or areas of interest (e.g., for eventual prediction of hazards and/or other purposes) in individual units of the data provided by the user (e.g., consumer). For example, individual images in a video may be presented as an input to a convolutional neural network that performs detection for items belonging to classes needed to generate an accurate inventory list (e.g., as described herein). Other algorithms such as linear regression, etc. may also be used. Multiple different machine learning models, algorithms, etc., may be used to process one or more different inputs. As an example, besides item detection using a convolutional neural network, another different convolutional neural network may be used to classify a location of an item to be a type of a room such as a bedroom, kitchen, etc. As another example, the unit of data such as an image frame may be first processed by a machine learning algorithm and/or model, such as a convolutional neural network (e.g., a first stage), and the output of this network may be further processed by another algorithm and/or model such as a recurrent neural network (e.g., a second stage). The output may be a 2D and/or 3D bounding box, and/or a mask around the items of interest, or, for audio data, a text string that processes and/translates the user voice input, etc. Similarly, the output of these networks can also include confidence values for the predictions, and the ordered set of classes that the detected object may be classified to.

As an example, a neural network (e.g., convolutional and/or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. In an embodiment, each individual neural unit may have a summation function that combines the values of all its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal)—e.g., an input-output pair. As described above, training inputs may be images, annotations, and/or other information, for example. A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network g: $X \rightarrow Y$, where X is the input space and Y is the output space. A feature vector is an n-dimensional vector of numerical features that represent some object (e.g., an image of a room with objects to be moved as in the example above). The vector space associated with these vectors is often called the feature space. After training, the neural network may be used for making predictions using new samples (e.g., images of different rooms).

At an operation 601c-3 spurious identifications and detections may be filtered out by using techniques such as non-max suppression (this example is not intended to be limiting) between items from the same or different classes. The machine learning may use variable optimized thresholds for achieving greater spurious suppression without (or substantially without) affecting true detections. For example, it may be likely to have two chairs next to each other. Thus, detections of two chairs with highly overlapping bounding boxes is likely to be correct. However, two detections of large refrigerators with high overlap are likely to contain one spurious detection (e.g., because it is unlikely that one house has two refrigerators, or further, two refrigerators positioned right next to each other). Similarly, the system is configured to recognize that detection of a jet-ski and a kayak next to each other is plausible, however, detection of a jet-ski next to a bed may be spurious.

The system can also utilize context such as room (e.g., bedroom, hallway, kitchen, garage, living room, etc.) and object class (e.g., furniture, appliances, etc.) for suppression. Outputs from multiple data units may be combined on a logical basis (such as data belonging to a particular room or area) and form a block of data that is used for generating part of the inventory (e.g., for that room or area). For example, frames for a video segment recorded for a particular room may form a block of data. An object may be present in multiple data units, and thus be counted multiple times within a block of data.

At an operation 602c-1, the system may be used to correlate an object across multiple past and future data units present in a block of data and ensure that the inventory estimate for the block is accurate.

At an operation 602c-2, the system may use multiple techniques such as feature matching for items, detecting a pan change in the input video, etc., to determine whether some data units within a block of data are duplicates of previous inputs. As an example, a user (e.g., a consumer) may inadvertently make multiple recordings of a given area such as by recording first from left to right and then right to left in order to arrive at a new location for recording. Similar to the operations described above, the system may be configured to use techniques for suppressing spurious identifications or transforming identified classes using context.

These suppression algorithms may benefit from the processing of the data at the block level. For example, spurious detections at the level of an image frame may be suppressed using weighted temporal filtering. As another example, items detected inside the bounding box of other objects such as mirrors and television sets may be suppressed. As another example, if a mattress is detected close to a headboard, the mattress is determined to likely be on top of a bed-frame and the confidence threshold for detecting bed-frames in the block of data can be lowered.

At an operation 602c-3, the system may recognize that many items may not be identifiable within a unit of data. As an example, an item may be partially occluded from a particular view, but may become more visible later in a user (e.g., consumer) recorded video. Similarly, a large item may never be completely visible within a single unit of data. As another example, an item may be identified as belonging to different classes in different units of data. The system may utilize techniques such as weighted temporal filtering, strict class rank hierarchy, and contextual information, etc., to generate attributes of the items identified in the block of data. As an example, the size of a bed may be detected as a king, queen, or indeterminate during detections on individual frames. However, at the block level the system may use the outputs such as the confidence values for predictions and other meta-data to classify the item. Similarly, if an item is predicted to belong to two closely related classes that vary in size, such as a loveseat and a large sofa, the system may use the confidence values of the predicted classes to adjust the volume and weight of the item.

At an operation 603c-1, the system may utilize outputs of one or more blocks of data to generate ancillary data that is useful in accurate inventory estimate generation. For example, insurance requirements for a bookshelf may be estimated by the system as a function of the size of the bookshelf.

At an operation 603c-2, the system may be used to remove spurious objects across multiple blocks of data. For example, an inventory estimate of kitchen items may inadvertently include items from the living room that were present in a video segment for the kitchen as well as the living room.

At an operation 603c-3, the system may also be used to select the units and/or fractions of units that may be used to present to the user. For example, an object may be present in multiple units. However, to present the object to the user only a single unit or a box identifying the object within that unit may be selected. The algorithm to select these presentation segments can optimize for one or more metrics such as review time, aesthetics, etc.

Flow charts describing aspects of the present systems and methods related to insurance underwriting are presented in FIG. 7+ and described below For example, the process of obtaining a renter's insurance, homeowner's insurance, homeowner's warranty, and/or hazard insurance quote may depend on the value of the user's individual possessions. The process of getting a quote may rely on users calling the insurance company and describing their possessions. The present disclosure describes an automated way for users to obtain insurance quotes, save their data, and/or automatically verify with insurance companies in case of loss.

In some embodiments, an example workflow may include the following. A user may launch an app or another messaging channel (SMS, MMS, web browser, etc.) on a smartphone, tablet and/or other device and scan their room(s) and/or other location(s). The app may collect camera frames, IMU data, and/or other data. One or more electronic models trained for item identification (as described herein) may be used to identify items in or around a location, and/or to determine attributes of the items. To identify items, the object detection technology may be able to identify auxiliary information such as brand of item and/or its estimated cost. The app working with a backend (e.g., processors 128 (FIG. 1) and/or the one or more electronic models described above) may generate an itemized list of items that the user owns (or possesses). The user may be able to select items the object detection technology may not be able to detect on the app by drawing a simple bounding box and/or annotating the object with the correct label (e.g., TV, speakers, and/or other objects). The app may ask for further information (e.g., brand, year of purchase, and/or other information). Processors 128 may cause an interface on a user computing platform (104) to ask targeted questions based on images/videos sent by the user to perform further analysis. Once the user is sufficiently satisfied, the list may be sent to different insurance companies to get a competitive quote. The data for the user may be saved until it needs to be updated and/or a claim event happens. In case of a claim event, the claim may be verified and/or users may be paid automatically based on the list of items in their possession as verified by the app. In some embodiments, the claim verification process may be performed in the app using visual and/or audio inspection trained by deep neural nets.

In order to provide an accurate representation of risk for insurance underwriting and/or other purposes, the present systems and methods are configured to consider the following factors and/or other factors: inventory of items (e.g., the objects detected by the present system and/or identified by the user) inside a location (e.g., a home) and outside the location, value of the inventory, age and/or condition of the inventory (e.g., used, broken, worn, etc.), the brand, serial number, type of material the inventory is made of, and exterior condition of a location, type and condition of a roof, walls, etc., a location of the property, identified hazards and/or other conditions associated with a location such as a flood zone, a location on a canyon, proximity to brush, a tree hanging over the roof, a tree touching the roof, multiple stories, etc., an interior condition of a location including a condition of walls, ceilings, etc., interior hazards and/or other conditions such as a set of stairs with no handrails, etc.

The present systems and methods may be configured to provide an insurance quote by analyzing the above parameters through a combination of expert human knowledge and computer vision (e.g., the machine learning and/or other AI algorithms described herein), enabled by cameras and IMUs available on a user's mobile device (e.g., user computer platforms 104 shown in FIG. 1), for example.

As a brief summary example, a consumer (and/or a representative of an insurance company) may launch an app (web app or native) on their smartphone to take pictures and quick videos of the interior and exterior of a home. The photos and videos may be time-stamped, geo-stamped (e.g., with latitude/longitude), device stamped (e.g., with device details including device model, operating system, IP address, browser information, etc. of the device generating the information) and user stamped (e.g., user profile details such as name, address, phone number, email address, etc.). Other accessorial details may be captured through voice or text via the smartphone, for example.

In some embodiments, one or more processors (e.g., the computer vision, machine learning, and/or other AI technology detailed in the description herein) uses these videos and pictures to: create a unique inventory of the items (e.g., furniture, appliances, walls, roof, doors, windows, etc.) inside and outside a location (e.g., a home) after performing duplicate detection; estimate the value of the detected inventory, taking brand name into consideration as well as risk assessment based on exterior attributes and/or hazards; and estimate the premium, fair market value of contents and replacement market value of contents. The above information may be combined with historical information for neighborhoods (e.g., zip codes, square footage of other locations, prior natural disasters in the area, etc.—obtained from external resources 124 shown in FIG. 1 for example) to adjust the premium.

The present systems and methods may be configured to present the analysis to a desk underwriter for adjustment. The desk underwriter may follow up with the user (consumer) for additional information to make adjustments for the premium estimation. Upon successful underwriting, the information may be fed back to a machine learning model/algorithm that can refine an insurance premium estimation for future premiums. The output of the underwriting process can also be used to estimate Fair Market Value (FMV) and Replacement Market Value (RMV) for contents in the case a claim is made in the future, for example.

Figure 7:
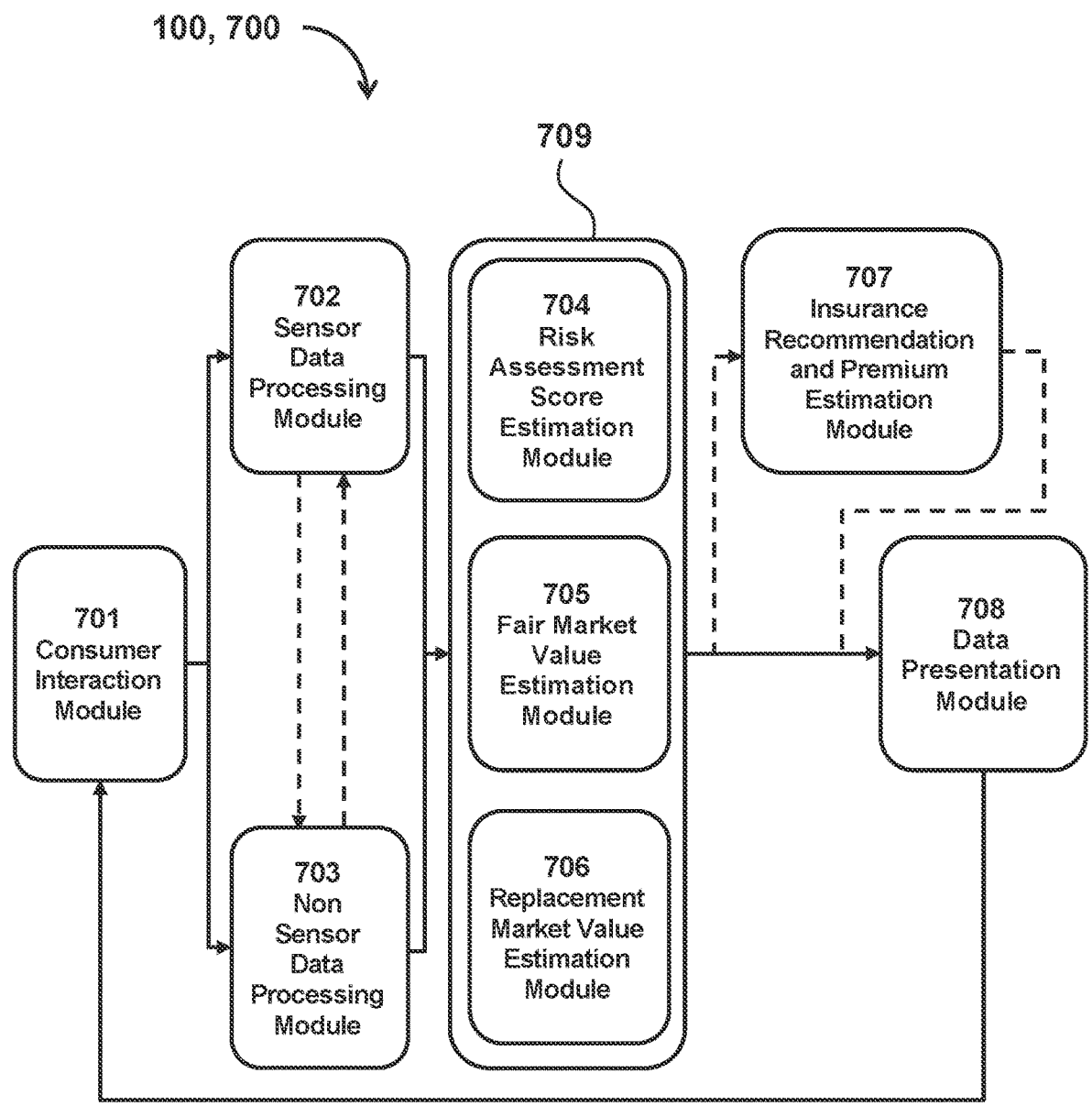
FIG. 7 illustrates an example embodiment of the present systems and methods configured for insurance underwriting, in accordance with one or more embodiments.

FIG. 7 illustrates an example embodiment 700 of the present system 100 (and method) configured for insurance underwriting. System 100 is configured for providing insurance underwriting estimates utilizing the one or more electronic models described herein. System 100 may comprise one or more hardware processors (e.g., processors 128 shown in FIG. 1) configured by machine-readable instructions (e.g., 106 shown in FIG. 1) to perform various insurance underwriting operations. Machine-readable instructions 106 may include various components (e.g., components 108, 110, 112, 114, 116, etc. shown in FIG. 1). These components may include various modules and/or other components. The modules may include programmed instructions and/or code, instructions stored on a storage medium, and/or other components configured to facilitate the operations described below.

As described above, in some embodiments, the one or more processors may be configured to receive description data of a location. The description data may be generated via at least one of a camera (e.g., included in a user computing platform 104), a user interface (e.g., presented by a user computing platform 104), an environment sensor (e.g., a microphone, etc. included in a user computing platform 104, and/or other sensors not included in a user computing platform such as weather sensors, etc.), an external location information database (e.g., as described related to component 108 and it other paragraphs herein), and/or other sources. The description data may comprise one or more media types, the media types comprising at least one or more of video data, image data, audio data, text data, user interface/display data, and/or sensor data. Receiving description data may comprise receiving sensor data from the one or more environment sensors. The one or more environment sensors may comprise at least one of a GPS, an accelerometer, a gyroscope, a barometer, a microphone, Lidar, a depth sensor, and/or other sensors. In some embodiments, sensor data may be captured by a mobile computing device associated with a user and/or estimator (e.g., a first user computing platform 104 associated with a user (consumer) and/or a second user computing platform 104 associated with an estimator/underwriter) and transmitted to the one or more processors with or without user and/or estimator interaction.

In some embodiments, the description data may be time stamped, geo stamped, and/or user stamped. Time stamps are useful for creating a chronological history of user interaction. Geo stamps are useful for verifying the user address. User stamps are useful for grouping data for users and verifying the user identity.

The one or more processors may be configured to generate an inventory list comprising a plurality of items (e.g., objects) in and/or around the location, utilizing a machine learning model, based on the description data. The plurality of items may comprise one or more of a piece of furniture, an appliance, carpet, a wall, a roof, a window, a floor, structures, and/or other objects. The inventory list may comprise inventory attributes associated with the plurality of items related to a context of the plurality of items in the location. This may be performed substantially as described above.

In some embodiments, generating the inventory list comprises determining the one or more inventory attributes. The inventory attributes may comprise one or more of locations of the items (e.g., objects) in and/or around the location, a quality of items in and/or around the location, brand names of the items in and/or around the location, dimensions of the items in and/or around the location, values of the items in and/or around the location, an age of the items in and/or around the location, a damage level associated with the items in and/or around the location, and/or other information.

The one or more processors may be configured to determine, utilizing a machine learning model, based on the description data, interior and/or exterior condition information for the location. The interior and/or exterior condition information may describe a quality of structural components of the location and/or hazards in and/or around the location, and/or other information. In some embodiments, the interior and/or exterior condition information comprises a description of a spatial position of the location relative to potential natural hazards. This can include a geographical and/or spatial position, distances, relative locations, etc. (e.g., edge of a canyon, near brush or forest that may burn, in a flood zone, in an earthquake zone, etc.). The description of the spatial position of the location relative to potential natural hazards may be determined at least in part based on information from the external location information database (e.g., that is included in external resources 124 shown in FIG. 1). For example, the external location information database may comprise a mapping database.

The one or more processors may generate, utilizing a machine learning model, based on the inventory list and the interior and/or exterior condition information, one or more insurance underwriting estimates for insuring the location. Generating the one or more insurance underwriting estimates utilizing the machine learning model may comprise causing a neural network to determine the one or more insurance underwriting estimates using at least one or more of the inventory attributes, the quality of structural components of the location, and the hazards in and/or around the location as inputs for the neural network. This may also and/or instead include using other learning algorithms like random forest, etc., which may work in combination with a neural network as an ensemble machine learning model. In some embodiments, generating the one or more insurance underwriting estimates utilizing the machine learning model may comprise causing a neural network to determine the one or more insurance underwriting estimates using at least one or more of the inventory attributes, the quality of structural components of the location, and the hazards in and/or around the location as inputs for the neural network. In some embodiments, generating the one or more insurance underwriting estimates for insuring the location comprises determining a risk level for the location, a fair market value for the items in the inventory list, a replacement market value for the items in the inventory list, and/or other information.

In some embodiments, the one or more hardware processors (e.g., processors 128) may be further configured to receive adjustments to a given insurance underwriting estimate, and use the adjustments and corresponding inventory attributes, quality of structural components of the location, and/or hazards in and/or around the location, as input to (1) update the one or more insurance underwriting estimates, and/or (2) retrain the one or more electronic models (e.g., a neural network). In some embodiments, the one or more hardware processors may be configured such that a user and/or an estimator can adjust the description data, the inventory list, the interior and/or exterior condition information, the insurance underwriting estimates, and/or other information (e.g., via a user computing platform 104 associated with a user and/or an adjuster).

Looking at FIG. 7, a goal of the present system is to collect relevant information for underwriting an estate based on sensor and/or non-sensor data (e.g., from a consumer interaction module 701—e.g., formed by receiving component 108 and/or other components shown in FIG. 1), sensor data processing module 702 (e.g., components 110 and/or 112 shown in FIG. 1) and non-sensor data processing module 703 (e.g., components 108, 114, 116 shown in FIG. 1) to estimate a risk assessment (with an example risk assessment score estimation module shown in block 704), a fair market value (block 705), and replacement market value of the estate (block 706), as well as recommend whether to insure or not insure the estate and estimate a premium for the estate (block 707). Collectively, blocks 704-706 may form an underwriting estimations module 709, for example.

Relevant insurance information that could be identified through sensor data processing module 702 could include, but is not limited to, items detected at the location and features that describe the location (as described above). The present system is agnostic to interior/exterior context differences. Both contexts can take advantage of sensor and non-sensor data processing to aid in the underwriting process.

Relevant insurance information that could be retrieved or looked up (e.g., obtained) from a database or third-party source (e.g., external resources 124 shown in FIG. 1) via non-sensor data processing module 703 could include, but is not limited to, potential surrounding environmental or societal risks for the location, as well as previous work or damage done to the location. Relevant insurance information discovered through sensor data processing may be used to enhance the relevant insurance information gathered via lookup/retrieval in non-sensor data processing and vice versa, for example.

An (e.g., AI and/or other machine learning) model, such as a neural network, may be used for estimating a location's risk assessment score in block 704, fair market value in block 706, and replacement market value in block 707, as well as for recommending whether to insure or not insure and estimating the insurance premium in block 708.

In some embodiments, the consumer interaction module 701, formed by receiving component 108, adjustment component 114, and/or report component 116 shown in FIG. 1) may be, be part of, and/or control an app on the user end (e.g., running on a user computing platform 104) that is used to collect data and present processed results. The sensor data processing module 702 (e.g., formed by inventory component 110 and/or condition component 112) may be configured to process sensor data and generate a list of detected items/inventory (objects) as well as a list of detected features/conditions/hazards relevant to underwriting. The non-sensor data processing module 703 (e.g., formed by receiving component 108, adjustment component 114, and/or report component 116 shown in FIG. 1) may be configured to processes non-sensor data to assist in underwriting or to retrieve/lookup other relevant information to underwriting. The risk assessment score estimation module (shown in block 704, formed by report component 116) may be configured to use relevant sensor and non-sensor processing results to estimate the risk assessment score of the collective property (e.g., items/objects, structural features, etc.) detected in and described by the input description data. The fair market value estimation module (shown in block 705, formed by report component 116) may be configured to use relevant sensor and non-sensor processing results to estimate the fair market value of the collective property (e.g., the collection of items/objects, structures, etc.) detected in and described by the input description data. The replacement market value estimation module (shown in block 706, formed by report component 116) may be configured to use relevant sensor and non-sensor processing results to estimate the replacement market value of the collective property detected in and described by the input description data. The insurance recommendation and premium estimation module (shown in block 707, formed by report component 116) may be configured to receive the risk assessment score, fair market value, and replacement market value estimates, and recommend whether to insure or not insure, as well as estimate a premium for the collective property detected in and described by the input description data. The data presentation module (shown in block 708, formed by report component 116) may be configured to summarize output across the data. This output can include, but is not limited to, a set of images/3D model with machine learning results, as well as an insurance recommendation, premium estimation, risk assessment score estimation, fair market value estimation, replacement market value estimation, and/or other information.

It is to be understood that the recitation of individual modules is not intended to be limiting. As described above, the modules may be formed by the one or more processors, or portions of the one or more processors. In some embodiments, some or all of the recited modules may or may not be used, may be included with other modules, etc.

Figure 8:
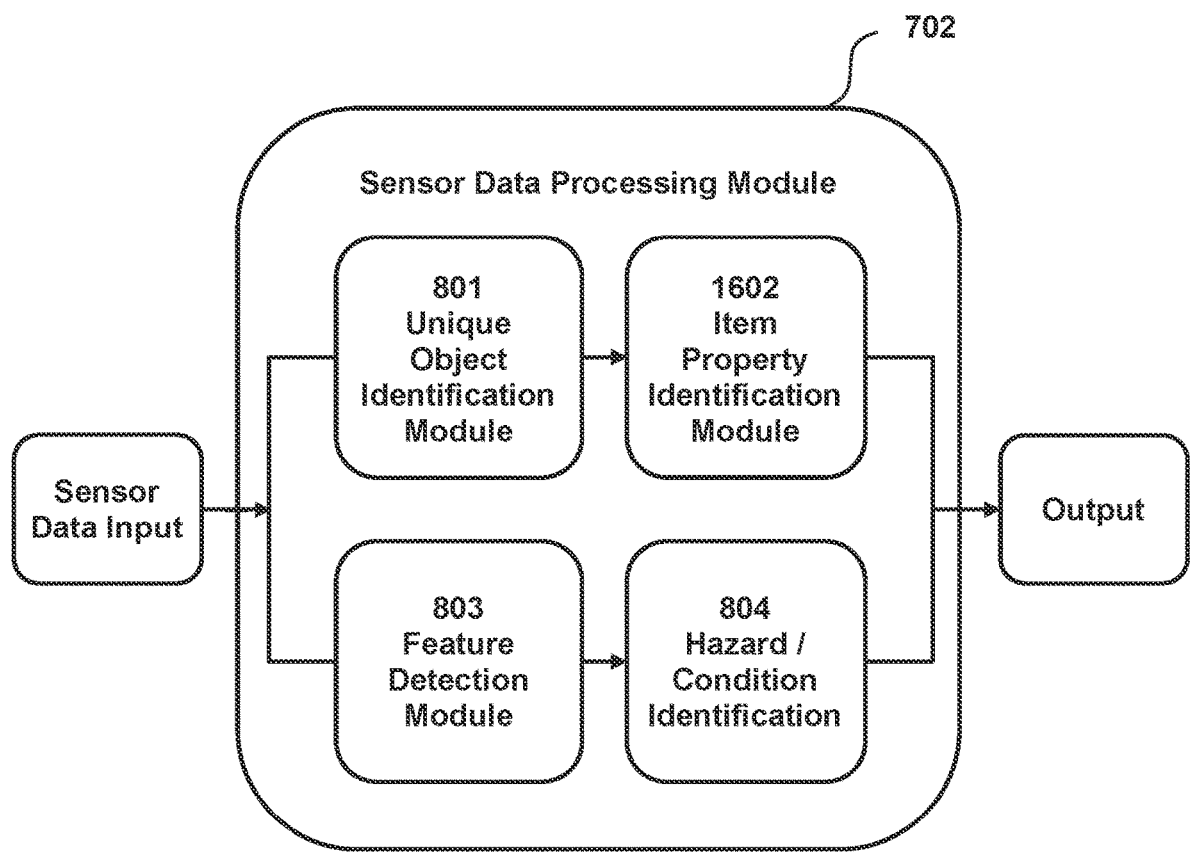
FIG. 8 illustrates an example of a sensor data processing module of the present system, in accordance with one or more embodiments.

FIG. 8 illustrates an example of the sensor data processing module 702. Description data (e.g., generated by one or more sensors as described herein) may be used to identify unique items (with a unique object identification module 801) for compiling an inventory of items (objects) and their attributes (properties—e.g., with an item property identification module 802). It is also used to detect features of the location (block 803) that could indicate potential hazards and/or conditions (block 804).

The unique object identification module 801 may be configured to uniquely identify items/objects in the sensor data such that detections are associated correctly (e.g., the same television is detected twice) and spurious detections are removed (e.g., only one television is identified, not two in this example). The item property identification module 802 may be configured to identify various attributes/properties of the items to compile a detailed inventory for a location. The feature detection module (shown in block 803) may be configured to features that indicate hazards and/or conditions for a location. The hazard/condition identification module (shown in block 804) may be configured to identify hazards and/or conditions affecting a location based on the features detected that are relevant to underwriting or future claims.

Figure 9:
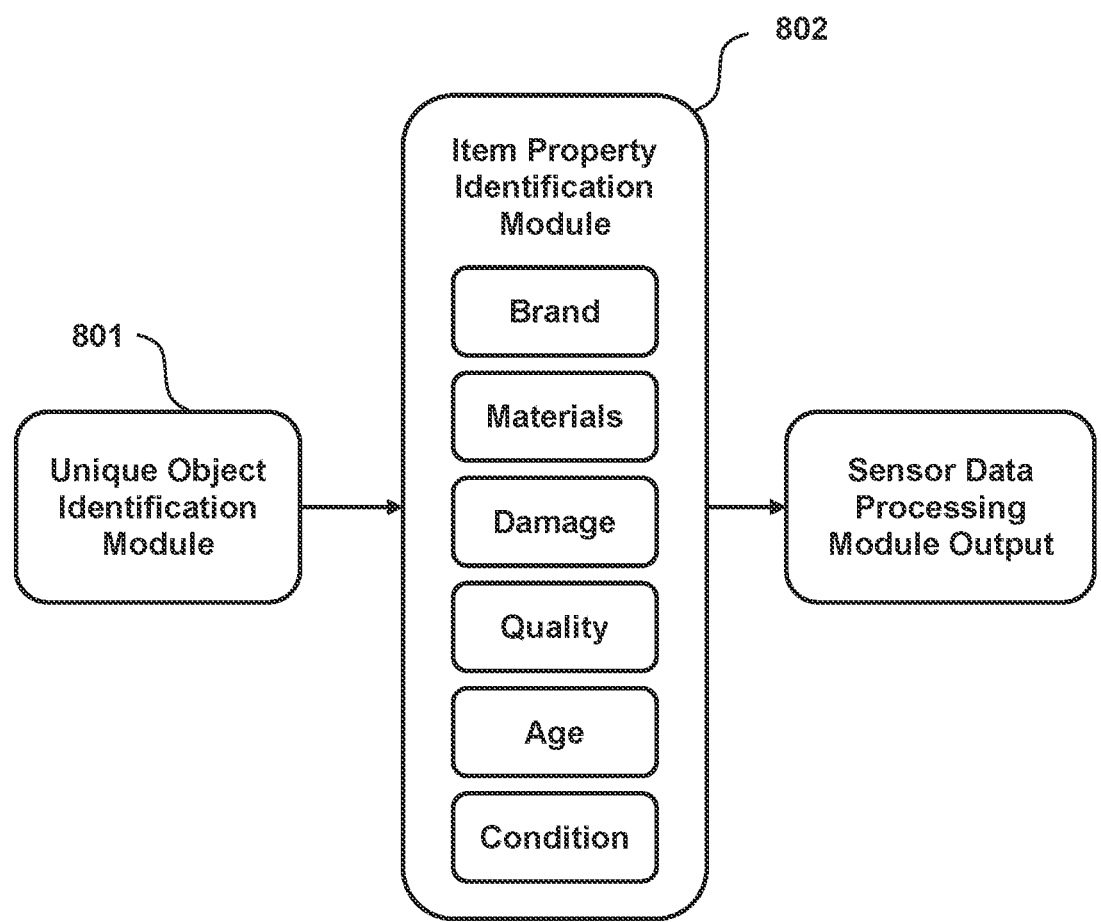
FIG. 9 illustrates an item property identification module of the present system, in accordance with one or more embodiments.

FIG. 9 illustrates aspects of the item property identification module 802. The item (object) attributes/properties that may be detected/identified/estimated by the item property identification module 802 can include, but are not limited to, brand, materials, damage, quality, age, condition, etc. One method for detecting the materials comprising an item could be detecting the various textures of the item and inferring what the materials are based on these textures. Such detection may be done using object detection, semantic segmentation, and/or instance segmentation. Materials that could be detected include, but are not limited to, plastic, wood, metal, fabric, leather, concrete, glass, ceramic, rubber, foam, clay, and stone.

Brand detection may be done using methods such as object detection and instance segmentation for detecting the brand's symbol/icon. Image classification could also be used to identify the brand of an item for brands that have distinct visual styles. Brand detection could also be improved by feeding the item's detected materials as extra input to the detector/classifier as some brands may use a distinct combination of materials.

Damage detection may be done using methods such as image classification, object detection, and instance segmentation. This detection could detect the type of damage as well as estimate the severity of the damage relative to damage of this type. For the case of object detection, the annotation needed for this type of data would be similar to standard object detection where the input data is a bounding box and the expected output data is a label describing the type of damage, as well as a decimal value indicating how severe the damage is relative to all damage. Damage that could be detected includes, but is not limited to, dents, scratches, weathering, rust, cracks, cuts, chips, and warping.

Quality estimation may be done using image classification, or by using the results from brand and material detection to estimate the quality with a learning algorithm, such as a neural network. Age estimation may be done using image classification, or by using the results from brand, material, and damage detection to estimate the age with a learning algorithm, such as a neural network. Condition estimation could be done using image classification, or by using the results from damage detection with a learning algorithm, such as a neural network. Reverse image search may also be used to retrieve information from an image database for items similar or the same as the detected item. This retrieved information could include other properties, such as the item's cost, which could be used to help estimate values such as the replacement market value.

Figure 10:
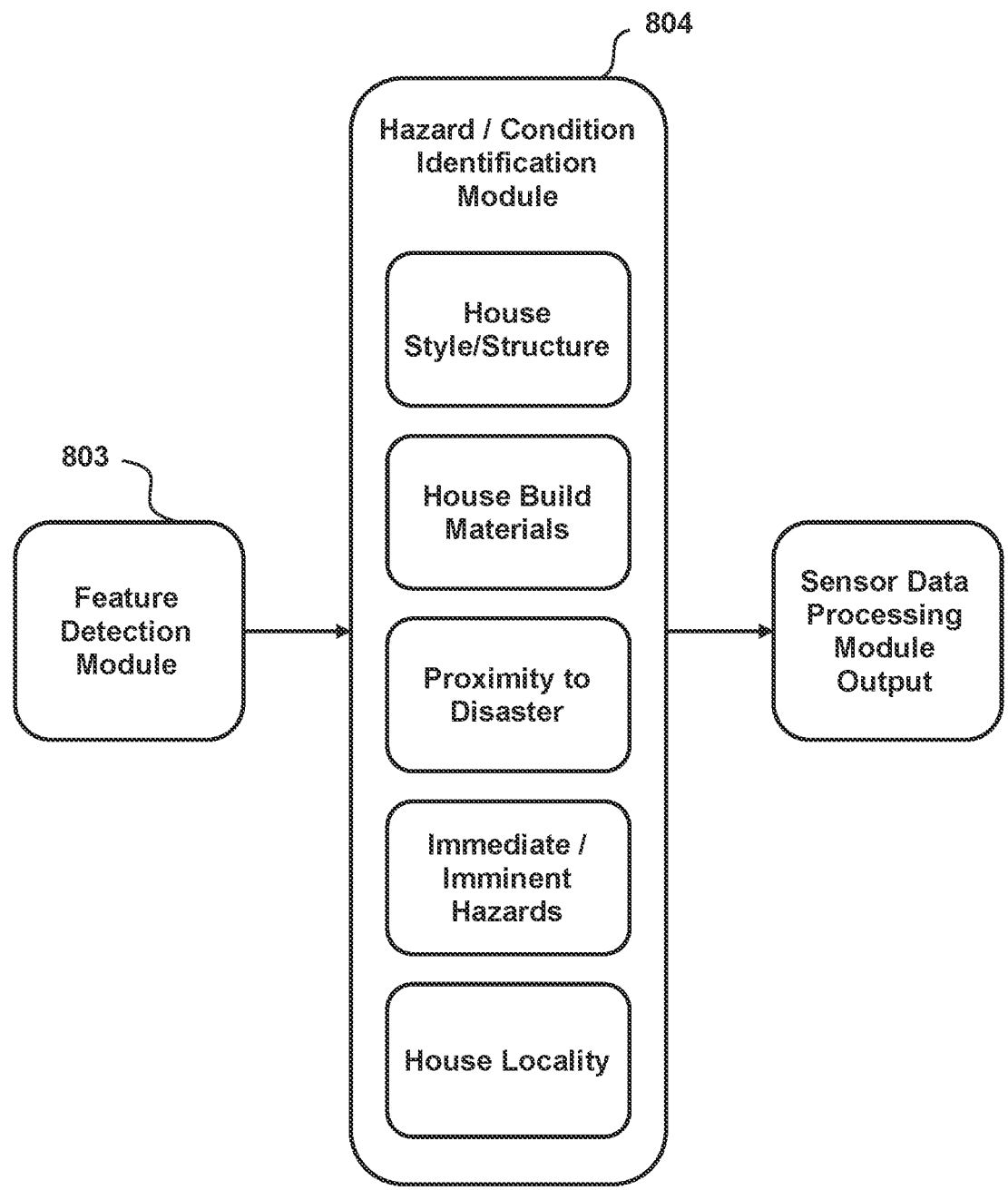
FIG. 10 illustrates aspects of a hazard/condition identification module of the present system, in accordance with one or more embodiments.

FIG. 10 illustrates aspects of the hazard/condition identification module (block 804). This module is configured to identify location hazards and/or other conditions, both interior and exterior. A location may include a house and/or other structures, surrounding property, and/or other components. The hazards and conditions can include, but are not limited to, the style/structure of the location (e.g., house—1 story, split-level, tri-level, overlooks a canyon/cliff-side), the materials used for building the house (e.g., wood, brick), the house's proximity to disaster prone regions (e.g., flammable brush close to property, earthquake zones, flooding zones, etc.), immediate and/or imminent hazards proximate to the location (e.g., trees hanging above roof, stairs without handrails), and/or environmental/societal risks due to house locality (e.g., dangerous neighborhood).

This module uses a mix of methods. One potential method is scene understanding for identifying location (e.g., house) style, house build materials, and immediate and/or imminent hazards. A scene may be a view of a portion of a location such as a portion of a house at the location, a room of the house, an area around a house, and/or other scenes for a location. Scene understanding can include a combination of semantic segmentation, object detection, etc. 3-dimensional mapping/reconstruction can also be used in place of scene understanding, where a user collects images/videos (e.g., description data) of the location (e.g., via a smartphone associated with the user as described herein) and this data is used to create a map of the location. A variety of models can then be used to classify each of the categories like house style, house build materials, and immediate and/or imminent hazards. For example, a machine learning model may be used to classify the style of the house based on the 3D structure of the house. Another example is where a machine learning model may be used to draw 3D bounding box identifications on the house map and if an external object like a tree comes into contact with parts of the house, such as the roof, this is classified as a hazard. Another potential method is a look-up table and geographical map database search for identifying proximity to disaster prone regions and house locality based hazards and conditions. This module uses visual, inertial, and other descriptive data (e.g., audio, text) to determine hazards and conditions.

Figure 11:
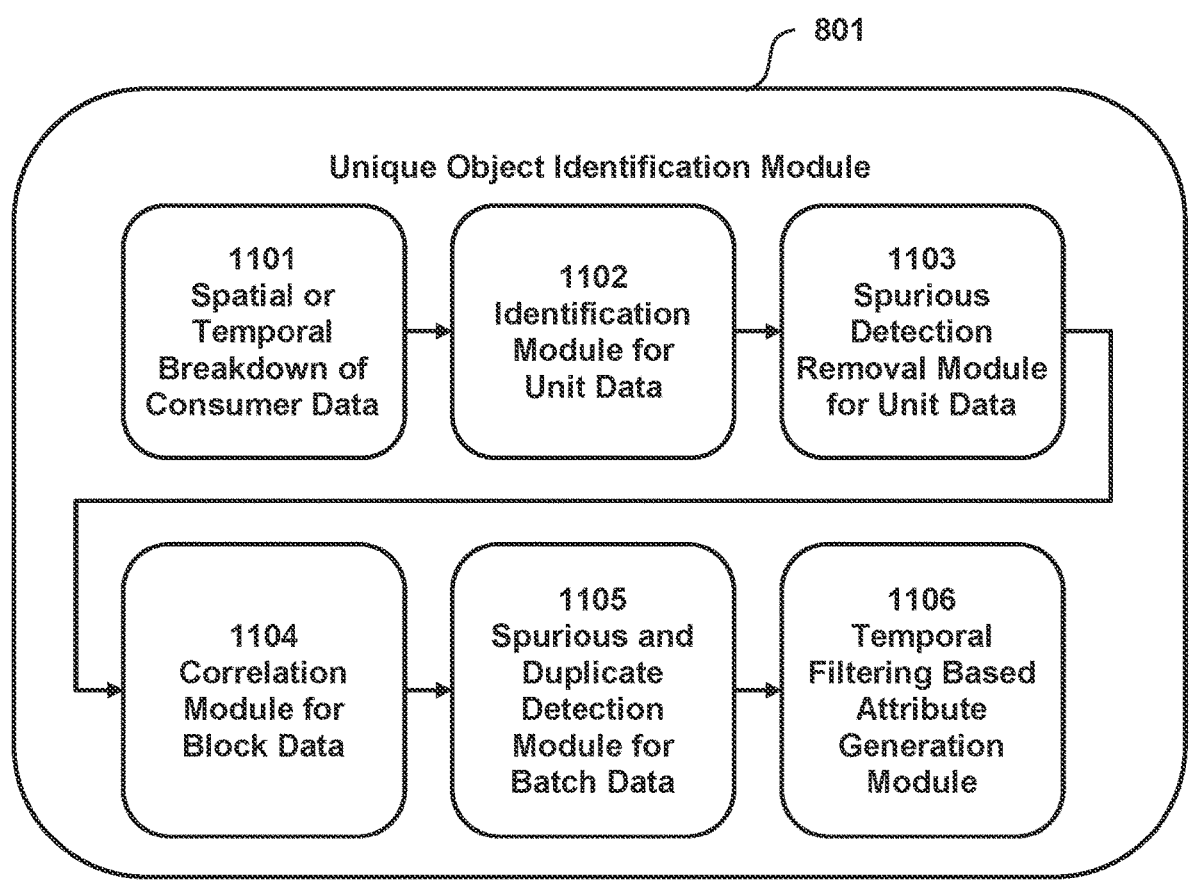
FIG. 11 illustrates a unique object identification module of the present system, in accordance with one or more embodiments.

FIG. 11 illustrates unique object identification module 801 (e.g., formed by inventory component 110 and/or condition component 112) of the present system, in accordance with one or more embodiments. The modules of unique object identification module 801 may include a spatial and/or temporal data breakdown module 1101. The description data, such as video or audio data, may be divided into smaller segments (units) using spatial, and/or temporal constraints (e.g., included in the description data) as well as other data such as context. For example, a video may be divided into multiple frames and poor quality images with low lighting and/or high blur may be filtered out. Similarly, an audio input may filter out segments comprising background noise and create units of audio where the speaker is actively communicating.

The modules may include an identification module 1102 and a spurious identifications suppression module 1103. The output of the object identification module may be noisy. Spurious identifications and detections may be filtered out, by the spurious identifications suppression module, by using techniques such as non-maximum suppression between objects from the same or different classes needed to generate the itemized statement. An artificially intelligent (e.g., machine learning) algorithm may use variable optimized thresholds for achieving greater spurious suppression without affecting true detections. For example, it is quite likely to have two chairs or tables located next to each other. Thus, two chair detections with highly overlapping bounding boxes are likely to both be correct. However, two detections of large refrigerators with high overlap are likely to contain one spurious detection. Similarly, it is likely to detect a jet ski and kayak next to each other, however, it is likely that a jet ski detected next to a bed is spurious. A machine learning algorithm can also utilize context such as room and object class for suppression. Outputs from multiple units may be combined on a logical basis (such as data belonging to a particular room or area) to form a block of data that is used for generating part of the inventory. For example, all frames for a video segment for a particular room may form a block of data.

The modules may include a correlation on batch data module 1104. An object may be present in multiple units of data, and thus be counted multiple times within a block of data. An artificially intelligent (e.g., machine learning) algorithm may be used to correlate the object across multiple past and future units present in the batch of data and ensure that the inventory estimate for the block data is accurate.

The modules may include a spurious and duplicate detection module for batch data 1105. A machine learning model may use multiple techniques such as feature matching for objects, detecting a pan change in the input video, etc., to determine if some units within a block of data are duplicates of previous inputs. As an example, a user may inadvertently make multiple recordings of a given area such as by recording first from left to right and then right to left in order to arrive at a new location for recording. Similarly, techniques for suppressing spurious identifications or transforming identified classes using context may be deployed. These suppression algorithms may benefit from the processing of the data at the block level. For example, spurious detections at the level of an image frame may be suppressed using weighted temporal filtering. As another example, objects detected inside the bounding box of other objects such as mirrors and television sets may be suppressed. Similarly, if a mattress is detected close to a headboard, the mattress is likely on top of a bed frame and the machine learning algorithm can lower the confidence threshold for detecting bed frames in the block of data.

The modules may include a temporal filtering based attribute generation module 1106. Many objects may not be identifiable within a unit of data. As an example, an object may be partially occluded from a particular view, but may become more visible later in a customer recorded video. Similarly a large object may never be completely visible within a single unit of data. In another case an object may be identified as belonging to different classes in different units of data. An artificially intelligent (e.g., machine learning) algorithm may utilize techniques such as weighted temporal filtering, strict class rank hierarchy, contextual information, etc., to generate the attributes of the objects identified in the block of data.

The modules may include a spurious and duplicate detection for an entire dataset module. An artificially intelligent (e.g., machine learning) model may be used to remove spurious objects across multiple blocks of data. For example, an inventory estimate of kitchen items may inadvertently include items from the living room that were present in the video segment for the kitchen as well as the living room.

The modules may include a data presentation module. An artificially intelligent (e.g., machine learning) model may also be used to select the units and/or fractions of units that may be used to present to the user. For example, an object may be present on multiple units, however, to present the object to the user only a single unit or a box identifying the object within that unit may be selected. The algorithm to select these presentation segments can optimize for one or more metrics such as review time, aesthetics, etc.

The modules may include a machine learning (e.g., an AI) identification module. In the systems and methods disclosed, machine learning identification may include, but is not limited to, marking the spatial region of the item in the user data by drawing a bounding box (2D/3D) or segmentation mask, labeling items such as chair/table etc., and finding spatial location information with respect to the scene.

Figure 12:
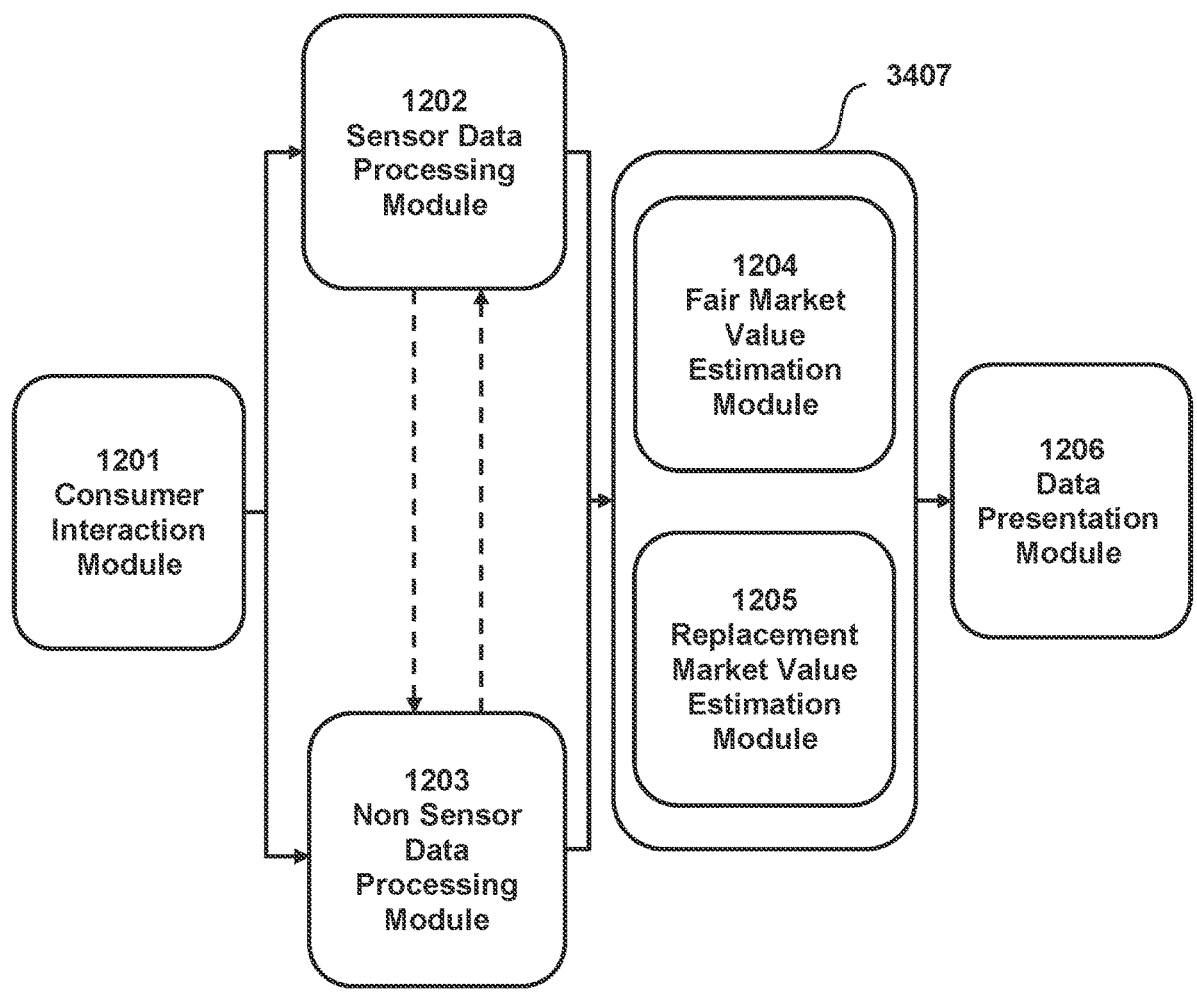
FIG. 12 illustrates a portion of the present system configured for addressing a content claim, in accordance with one or more embodiments.

FIG. 12 illustrates a portion of the present system configured to collect relevant information for addressing a content claims adjustment by using sensor and non-sensor data (e.g., illustrated in blocks 1201, 1202, 1203, which illustrate modules similar to and/or the same as corresponding modules described herein) to estimate the fair market value (block 1204 illustrates a fair market estimation value module), and replacement market value of the items (block 1205 illustrates a replacement market value estimation module) of items listed in a claim. Blocks 1204 and 1205 may collectively form a content claims estimations module 1207, for example. Block 1206 illustrates a data presentation module similar to and/or the same as corresponding data presentation modules described herein. This portion of the system may form a subset of the blocks shown in earlier figures, for example.

Relevant insurance information that could be identified through sensor data in block 1202 could include, but is not limited to, items detected at the location. The system is agnostic to interior/exterior context differences. Both contexts can take advantage of sensor and non-sensor data processing to aid in the contents claim process. Relevant insurance information that could be retrieved or looked up from a database or third-party source in block 1204 could include, but is not limited to, underwriting information for the items listed in the contents claim, such as their fair market value, replacement market value, damage, condition, etc., as well as current market prices for items and/or materials, etc. Relevant insurance information discovered through the sensor data processing may be used to enhance the relevant insurance information gathered via lookup/retrieval in non-sensor data processing and vice versa.

A rule-based system and/or a machine learning algorithm, such as a neural network, could be used for estimating the fair market value and replacement market value of the contents claim items in blocks 1204 and 1205, respectively. The adjusters can also manually update the replacement market value.

Figure 13:
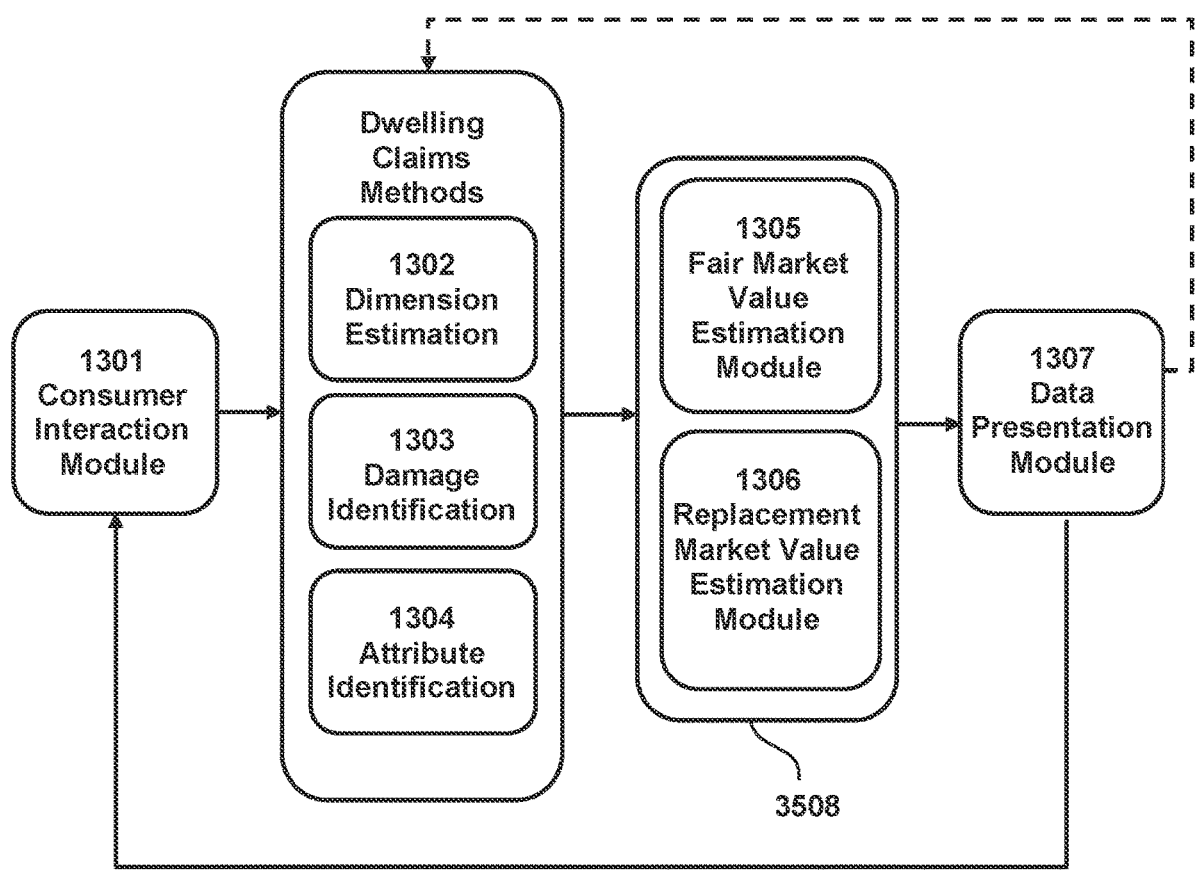
FIG. 13 illustrates a portion of the present system configured for addressing a dwelling claim, in accordance with one or more embodiments.

FIG. 13 illustrates a portion of the present system configured for addressing a dwelling claim. Block 1301 illustrates a consumer interaction module that is the same and/or similar to corresponding consumer interaction modules described herein. Block 1302 illustrates a module which can perform dimension estimation of the particular dwelling component that is subject to a replacement claim. An example where dimension estimation could be used for a replacement claim would be a wall that has to be replaced because of damage due to flooding (note this is just one example).

Block 1303 illustrates a damage Identification module which generally uses a machine learning model to identify damaged portions of the dwelling. For example, a convolutional neural network which does instance segmentation may be used to identify the region on a wall which has damages such as dents, scratches, scuffs, cracks, holes, etc. Block 1302 is not always dependent on block 1303 (and vice versa), in some embodiments, the system may be configured to directly estimate the dimensions of walls without having to identify the damage explicitly using a model.

An attribute identification module (illustrated in block 1304) is generally a machine learning algorithm such as decision trees, neural net, etc., which is used to identify the attributes of an item such as material, condition, etc. These attributes are later used in value estimation modules to compare with those of a similar item in new condition or match with a similar item whose value estimate is pre-determined and is stored in a database.

The collective information from damage identification, dimension estimation, and attribute identification modules may be used to determine whether the item may be repaired or replaced. For example, glass windows having smaller cracks are most likely to be replaced than repaired and walls with scratches may be repainted/repaired.

In the fair market value estimation module (block 1305) the item identifications and their attributes, such as dimensions, material type, condition, etc., are used to determine relevant information including, but not limited to, value estimates of same items from underwriting, and items that have similar attributes whose value estimates are pre-determined. The module can also update the fair market value based on the dimensions, item counts, etc., of each item before sending this information to the next module. The adjusters can also make changes to the fair market value.

The replacement market value estimation module (illustrated in block 1306) uses either a rule-based system or a machine learning algorithm, such as a decision tree, random forest, neural net, etc., to estimate the cost of replacing the particular item, given attributes such as materials, dimensions, etc., of that item. For example, a part of the wall is damaged and needs to be replaced. The machine learning model compares the attributes of the wall such as its materials, dimensions, etc., to those of a similar wall in new condition, and thereby estimates the replacement value of the damaged wall, regressing from the value of the new wall. The adjusters can also manually update the replacement market value. Block 1307 illustrates a data presentation module similar to and/or the same as corresponding data presentation modules described herein. Blocks 1305 and 1306 may collectively form a dwelling claims estimation module 1308, for example.

Figure 14:
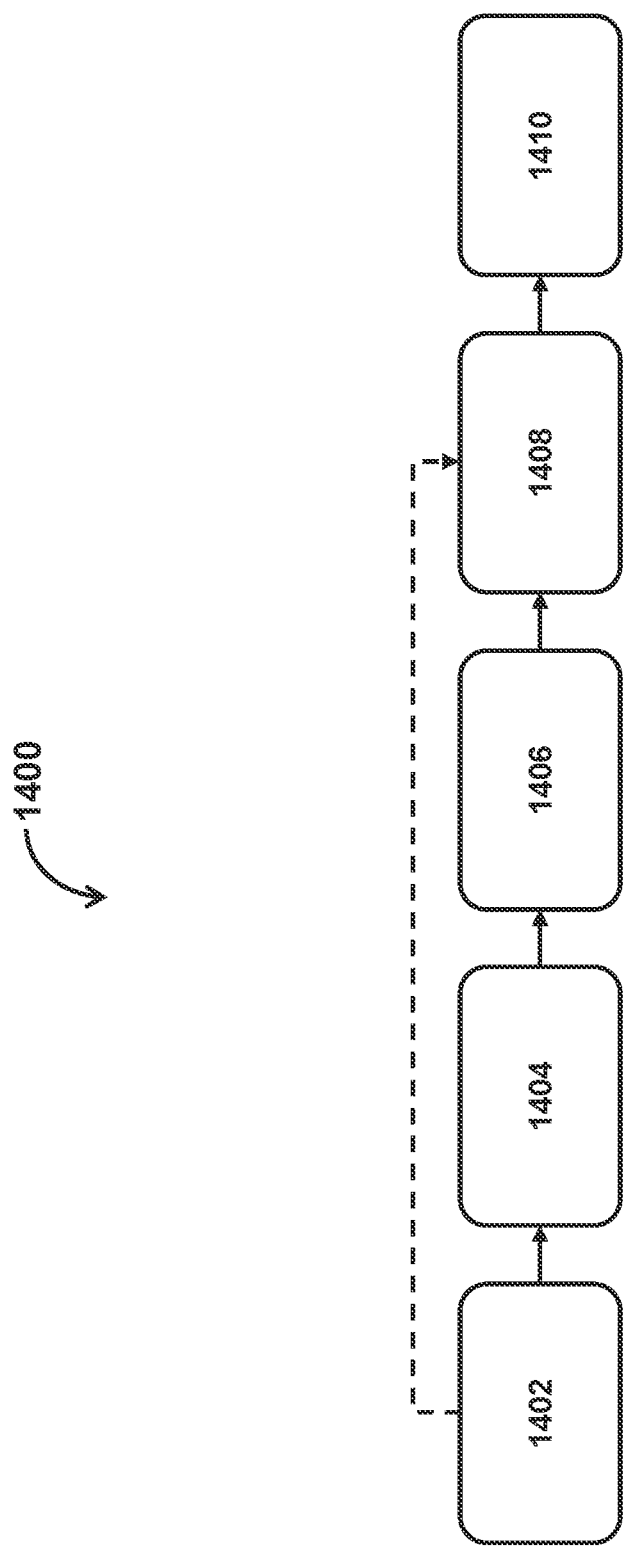
FIG. 14 illustrates a high level overview of an example of a present method, according to one or more embodiments.

FIG. 14 illustrates a high level overview of an example of a present method 1400. As shown in FIG. 14, description data (e.g., text, audio, video, image, sensor, and/or other data) for a location may be received 1402. The received description data may be used to identify 1404 items (e.g., contents, structures, etc.) at the location. Materials and conditions of the contents and structures may also be identified 1406. Hazards are identified 1408 (e.g., based on the items, materials, conditions, and/or the originally received description data), and an inspection report is generated 1410.

Figure 15:
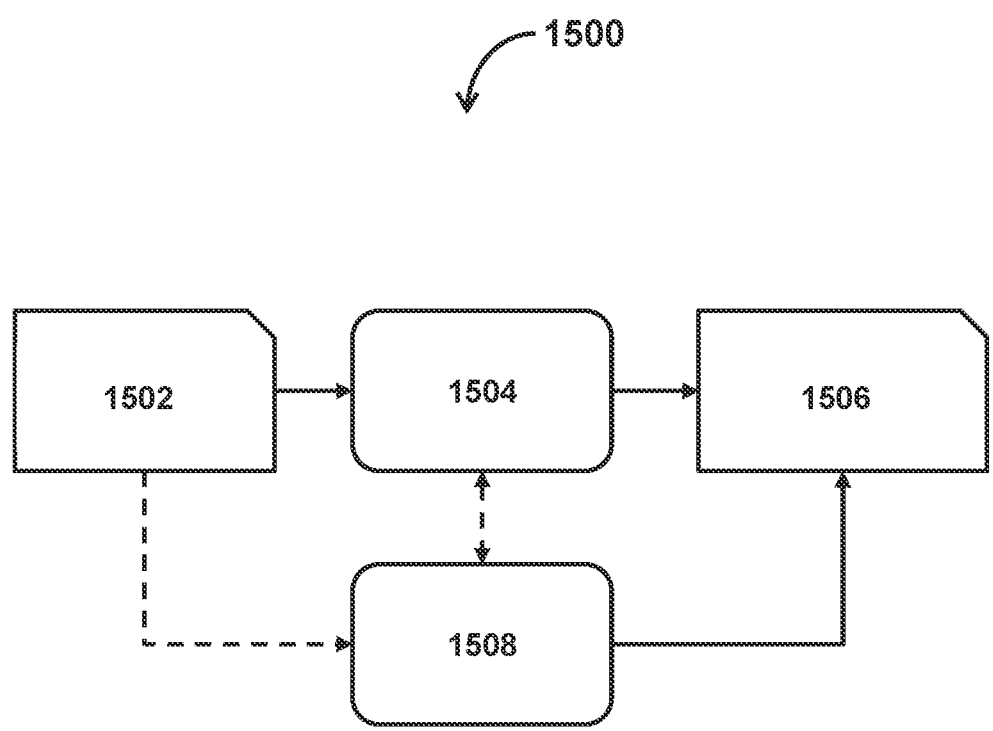
FIG. 15 illustrates an example of a present method for offline data processing (collection of images and/or videos) associated with contents and structures (items), according to one or more embodiments.

FIG. 15 illustrates an example of a present method 1500 for offline data processing of a collection of images and/or videos associated with contents and structures (items). As shown in FIG. 15, images and/or videos may be collected and/or otherwise received 1502. This data may be processed 1504 offline through machine learning (e.g., processor 128 and/or the one or more electronic models described herein) on a user's device (e.g., platform 104 shown in FIG. 1) and/or via a cloud based server (e.g., server 102 shown in FIG. 1), and contents, structures, their attributes, and associated hazards may be determined 1506. Optionally, method 1500 may include manual identification 1508 of contents and structures, which may be used to enhance operations 1504 and/or 1506.

In some embodiments, online processing may be and/or include processing of data in the same order/sequence as it is read, in a step by step fashion. Online processing does not take into consideration the data points that were captured beyond the current data time step. Real-time processing may include online processing with the constraint that the results are computed in real-time while data is being captured. Offline processing is processing of data post capture where access to all the data is made available and the results may be computed by taking all this data into consideration. There is no constraint of computing results in real-time. Real-time data capture may include capturing data while using a capturing app (and/or other means for data acquisition) in real-time. Offline data capture may include uploading pre-recorded data, or capturing data while not using an app's interface (e.g., capturing data using device native resources which do not have the interactive components of the app, such as giving suggestions or asking targeted questions to the user.

Figure 16:
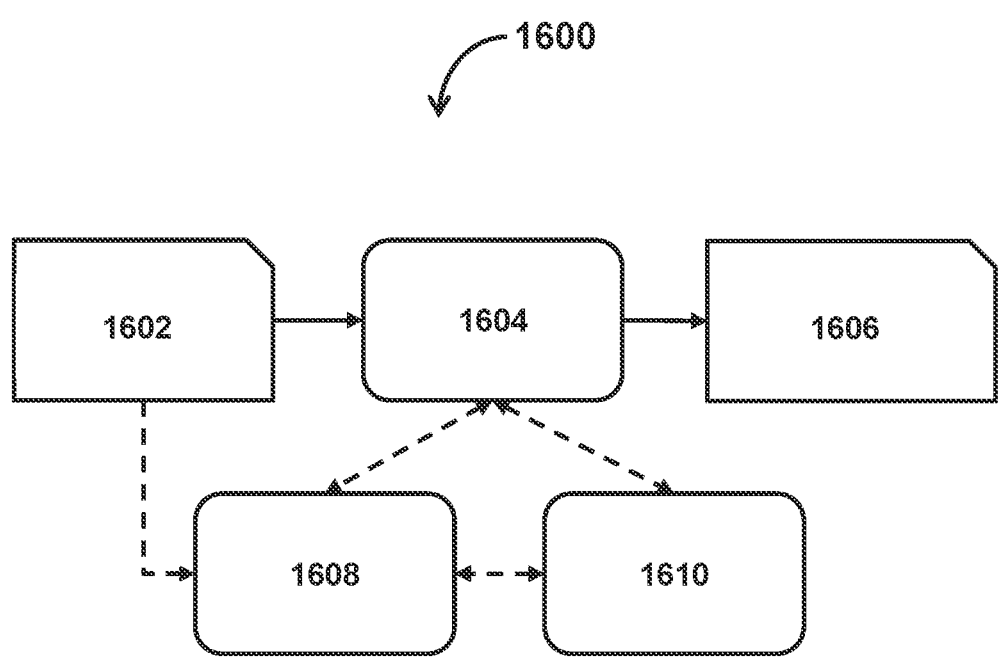
FIG. 16 illustrates an example present method for online image by image content and structure data processing, according to one or more embodiments.

FIG. 16 illustrates an example of a present method 1600 for online image by image content and structure data processing. As shown in FIG. 16, an image 1602 may be analyzed 1604 in real-time through machine learning (e.g., processor 128 and/or the one or more electronic models described herein) on a user's device (e.g., platform 104 shown in FIG. 1) and/or via a cloud based server (e.g., server 102 shown in FIG. 1), and contents, structures, their attributes, and associated hazards may be determined 1606. Optionally, method 1600 may include interactive annotation 1608 of data by a user at the location, and/or interactive annotation 1610 of the data by an insurance provider, which may be used at operations 1604, for example.

Figure 17:
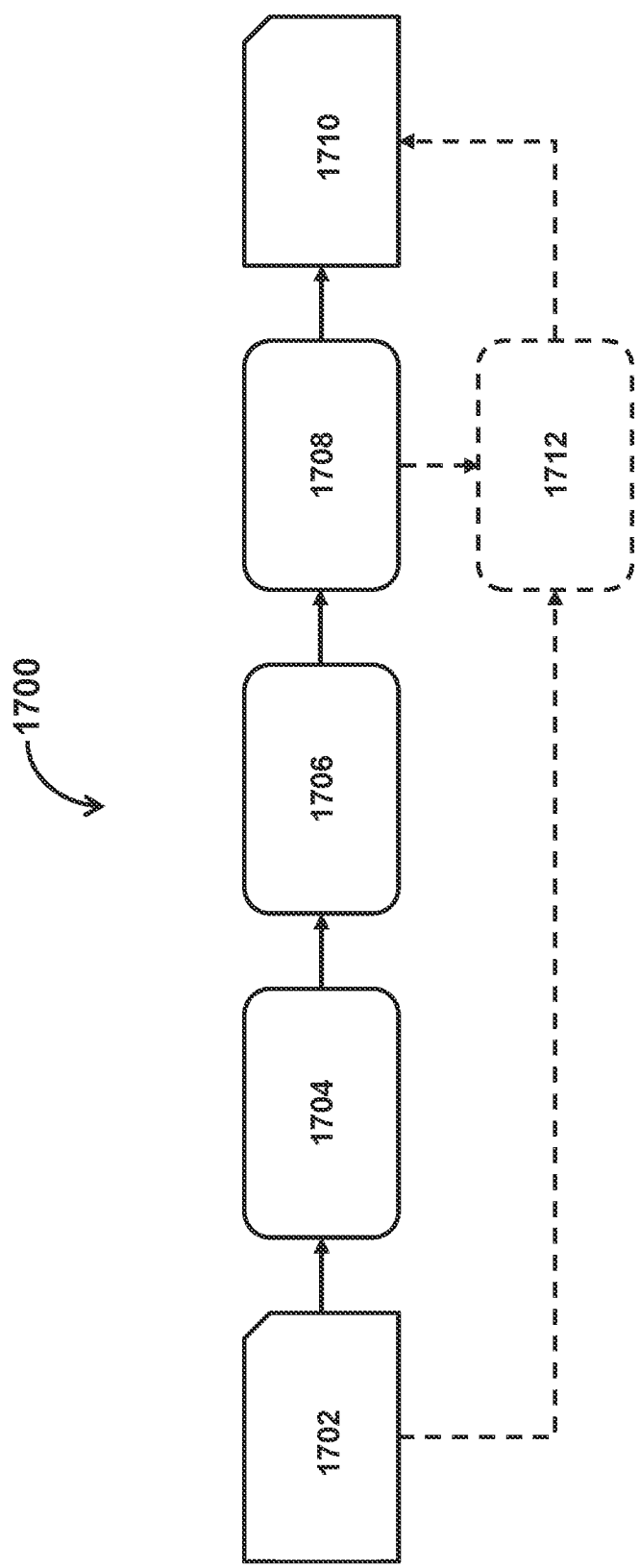
FIG. 17 illustrates an example of a present method for item (e.g., contents and/or structures) identification based on a collection of images, according to one or more embodiments.

FIG. 17 illustrates an example of a present method 1700 for item (e.g., contents and/or structures) identification based on a collection of images 1702. As shown in FIG. 17, contents and/or structures in the images 1702 may be spatially localized 1704 (e.g., as described herein). At an operation 1706, duplicate localizations may be identified and removed image by image, duplicate localizations may be identified and removed across images at an operation 1708, and then the contents and structures may be identified 1710. Optionally, method 1700 may include manual identification 1712 of contents and structure.

Figure 18:
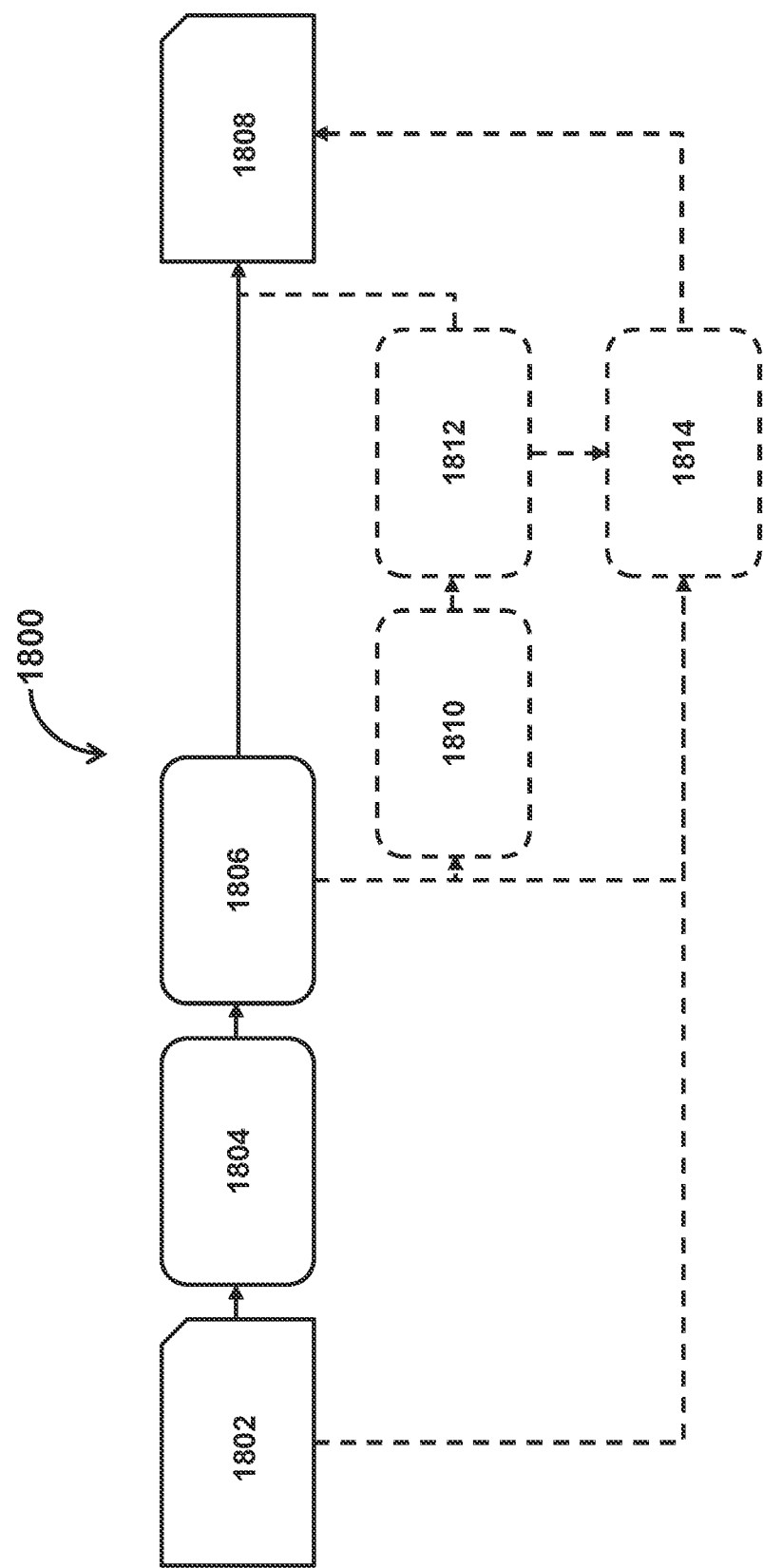
FIG. 18 illustrates an example of a present method for item (content and/or structure) identification based on ordered images and/or videos, according to one or more embodiments.

FIG. 18 illustrates an example of a present method 1800 for item (content and/or structure) identification based on ordered images and/or videos 1802. As shown in FIG. 18, contents and/or structures in the ordered images and/or videos 1802 may be spatially localized 1804 (e.g., as described herein). At an operation 1806, duplicate localizations may be identified and removed image by image, and then the contents and structures may be identified 1808. In some embodiments, localizations may be tracked 1810 across images (e.g., if a tracking algorithm was not used during detection), and then duplicate localizations may be identified and removed 1812 across images. In some embodiments, method 1800 may include manual identification 1814 of contents and structure.

Figure 19:
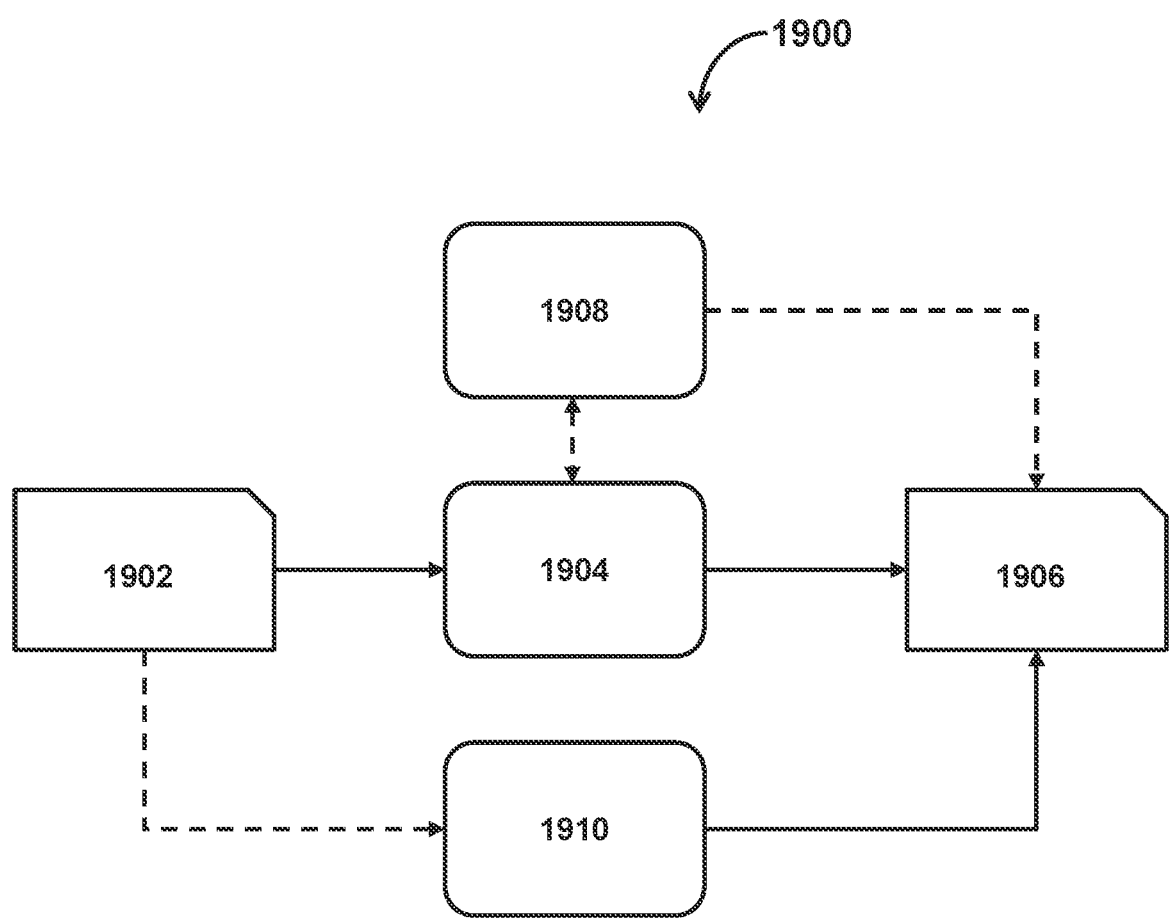
FIG. 19 illustrates an example of a present method for predicting, identifying, and/or otherwise determining hazards at a location based on a collection of images, according to one or more embodiments.

FIG. 19 illustrates an example of a present method 1900 for predicting, identifying, and/or otherwise determining hazards at a location based on a collection of images. Description data 1902 (e.g., captured via a graphical user interface provided on a user computing platform 104 as shown in FIG. 1), which in this example includes the collection of images, may be used to identify 1904 items (e.g., contents and structures), or attributes thereof, that may be hazardous, and predict, identify, and/or otherwise determine hazards 1906. In some embodiments, method 1900 may include spatial localization 1908 of objects that may be hazardous, and/or manual identification 1910 of hazards.

Figure 20:
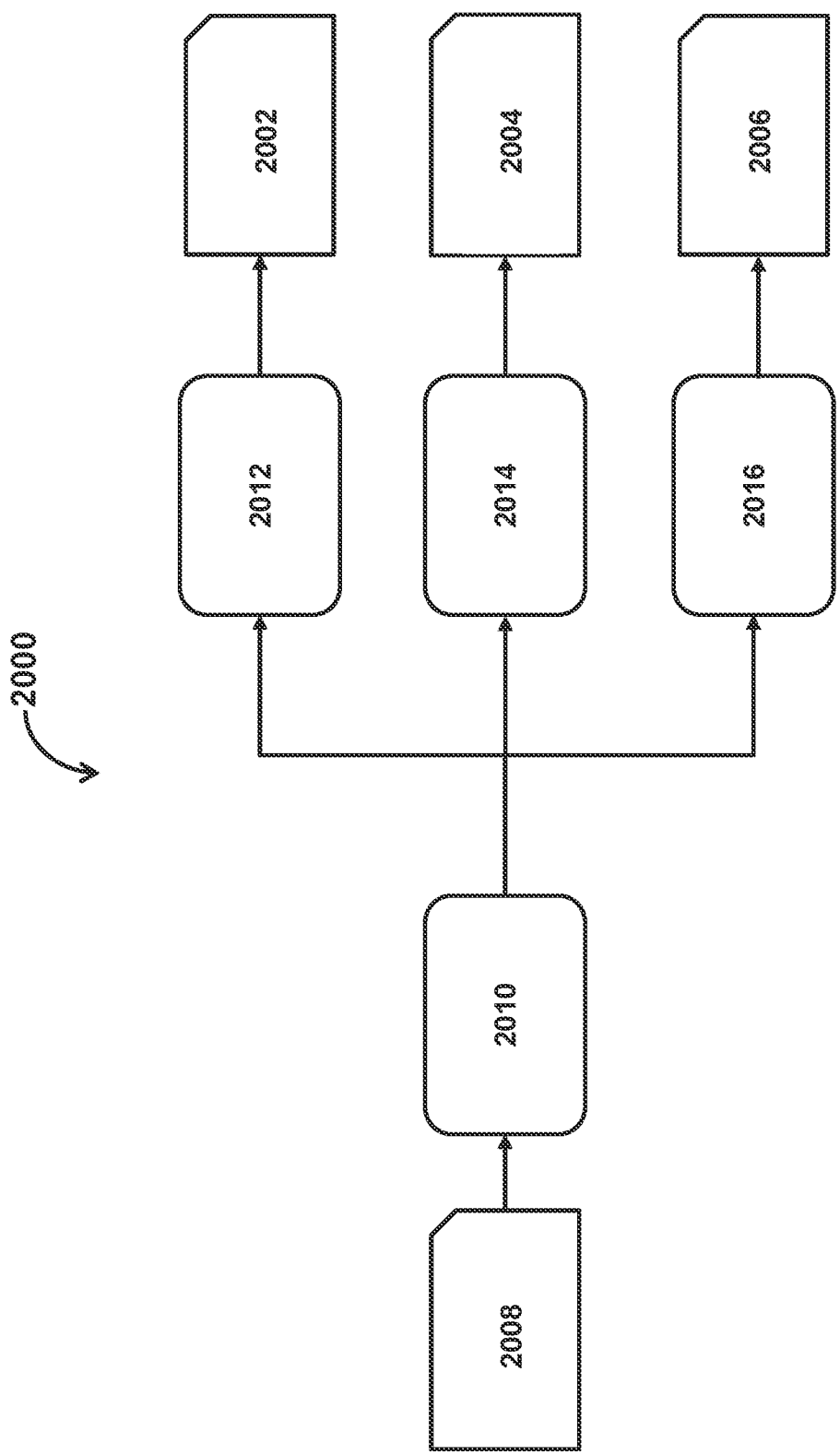
FIG. 20 illustrates an example of a present method for predicting, identifying, and/or otherwise determining different types of hazards, according to one or more embodiments.

FIG. 20 illustrates an example of a present method 2000 for predicting, identifying, and/or otherwise determining different types of hazards 2002, 2004, and 2006. In this example, the hazards are external object contact hazards 2002, falling hazards 2004, and roof slope hazards 2006. Using captured images and/or other sensor data (e.g., received description data) 2008, various contents, structures, etc. around a location may be spatially localized 2010 (in three dimensions in this example). Hazards 2002-2006 may be predicted, identified, and/or otherwise determined based on identified 2012 contact between a dwelling and external objects (e.g., a tree), identified overhanging structures and/or distances to nearby structures 2014, and roof slope computations 2016 (performed as described herein). It should be noted that these are just three of many possible examples.

Returning to FIG. 1, in some embodiments, server(s) 102, computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which server(s) 102, computing platform(s) 104, and/or external resources 124 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 124, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 124 may include sources of information, hosts and/or providers of social network platforms outside of system 100, external entities participating with system 100, and/or other resources. In some embodiments, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client a user computing platform 104.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some embodiments, processor(s) 128 may include a plurality of processing units. These processing units may be physically located within the same device, or processor(s) 128 may represent processing functionality of a plurality of devices operating in coordination. The processor(s) 128 may be configured to execute machine-readable instruction 106 components 108, 110, 112, 114, 116, and/or other machine-readable instruction components. Processor(s) 128 may be configured to execute machine-readable instruction components 108, 110, 112, 114, 116, and/or other machine-readable instruction components by software; hardware; firmware; some combination of software, hardware, and/or firmware; and/or other mechanisms for configuring processing capabilities on processor(s) 128. As used herein, the term "machine-readable instructions" may refer to any code and/or other programming, and/or instructions that cause a computing device and/or server to perform the functionality attributed to the components of processors 128.

It should be appreciated that although components 108, 110, 112, 114, and 116 are illustrated in FIG. 1 as being implemented within a single processing unit, in embodiments in which processor(s) 128 includes multiple processing units, one or more of components 108, 110, 112, 114, and/or 116 may be implemented remotely from the other machine-readable instruction components. The description of the functionality provided by the different components 108, 110, 112, 114, and/or 116 described herein is for illustrative purposes, and is not intended to be limiting, as any of machine-readable instruction components 108, 110, 112, 114, and/or 116 may provide more or less functionality than is described. For example, one or more of machine-readable instruction components 108, 110, 112, 114, and/or 116 may be eliminated, and some or all of its functionality may be provided by other ones of machine-readable instruction components 108, 110, 112, 114, and/or 116. As another example, processor(s) 128 may be configured to execute one or more additional machine-readable instruction components that may perform some or all of the functionality attributed herein to one of machine-readable instruction components 108, 110, 112, 114, and/or 116.

In the following, further features, characteristics, and exemplary technical solutions of the present disclosure will be described in terms of items that may be optionally claimed in any combination:

Item 1—A non-transitory computer readable medium having instructions thereon, the instructions configured to cause a computer to execute a multi-stage electronic model for predicting physical hazards at a location, the physical hazards changing over time and from location to location, each stage of the multi-stage electronic model being optimized based on a required computing capability and a maximum allowable processing time for a given stage to minimize overall computing resources and processing time for the multi-stage electronic model, the instructions causing operations comprising: receiving description data of the location, the description data generated via at least one of a camera, a user interface, an environment sensor, and an external location information database; predicting, with a first stage of the multi-stage electronic model, a potential hazard type based on the received description data, the potential hazard type comprising one potential hazard type of a set of predetermined potential hazard types, the first stage having a first configuration optimized for potential hazard type predictions based on the received description data; and predicting, with a second stage of the multi-stage electronic model, based on the predicted potential hazard type and the received description data, a physical hazard at the location, the second stage having a second configuration that is different from the first configuration, the second configuration associated with the predicted hazard type without regard for other potential hazard types, the second configuration optimized for predicting the physical hazard at the location once the hazard type is predicted by the first stage.

Item 2—The medium of any other item, wherein predicting the potential hazard type comprises identifying objects and structures at the location by one or more of: object detection, semantic segmentation, instance segmentation, and panoptic segmentation, object tracking through multiple images, feature-matching, optical flow estimation, relative camera pose estimation, multi-view projection, non-maximum suppression, class-based suppression, and heuristic suppression.

Item 3—The medium of any other item, wherein predicting the physical hazard comprises 3-dimensional reconstruction of the location using a Structure from Motion (SfM) algorithm, Multi-View Stereo (MVS), Simultaneous Localization and Mapping (SLAM), and/or depth estimation algorithms.

Item 4—The medium of any other item, wherein the description data includes interior and/or exterior condition information about the location, wherein the interior and/or exterior condition information comprises a description of a geographical and/or spatial position of the location relative to potential natural hazards; and wherein the description of the geographical and/or spatial position of the location relative to potential natural hazards is determined at least in part based on information from an external location information database.

Item 5—The medium of any other item, wherein the first and second stages of the multi-stage electronic model are trained with first and second training data, the first and second training data being different, the first training data comprising input-output training pairs associated with each potential hazard type in the set of predetermined potential hazard types, the second training data comprising input-output training pairs associated with only the predicted hazard type.

Item 6—A system configured for generating an inspection report utilizing a machine learning model, the system comprising one or more hardware processors configured by machine-readable instructions to: receive description data of a location, the description data generated via at least one of a camera, a user interface, an environment sensor, and an external location information database; generate an inventory list comprising a plurality of items at the location, utilizing the machine learning model, based on the description data, the inventory list further comprising inventory attributes associated with the plurality of items related to a context of the plurality of items at the location; determine, utilizing the machine learning model, based on the description data, interior and/or exterior condition information for the location, the interior and/or exterior condition information describing a quality of structural components of the location and/or hazards in and/or around the location; and generate, utilizing the machine learning model, based on the inventory list and the interior and/or exterior condition information, the inspection report for the location.

Item 7—The system of any other item, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, or a depth sensor.

Item 8—The system of any other item, wherein generating the inspection report comprises determining the one or more inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

Item 9—The system of any other item, wherein the description data is captured by a mobile computing device associated with a user and transmitted to the one or more processors with or without user interaction.

Item 10—The system of any other item, wherein generating the inspection report comprises causing the machine learning model to determine one or more insurance underwriting estimates using at least one or more inventory attributes, the quality of structural components of the location, and the hazards in and/or around the location as inputs for the machine learning model.

Item 11—The system of any other item, wherein the one or more hardware processors are further configured to receive adjustments to the inventory list and/or the interior and/or exterior condition information, and use the adjustments and corresponding inventory attributes, quality of structural components of the location, and/or hazards in and/or around the location, as input to (1) update the inspection report, and/or (2) retrain the machine learning model.

Item 12—The system of any other item, wherein the description data is time stamped, geo stamped, and/or user stamped.

Item 13—The system of any other item, wherein the interior and/or exterior condition information comprises a description of a spatial position of the location relative to potential natural hazards.

Item 14—The system of any other item, wherein the description of the spatial position of the location relative to potential natural hazards is determined at least in part based on information from the external location information database.

Item 15—The system of any other item, wherein the inspection report is determined at least in part based on information from an external market information database.

Item 16—A method for generating an inspection report utilizing a machine learning model, the method comprising: receiving description data of a location, the description data generated via at least one of a camera, a user interface, an environment sensor, and an external location information database; generating an inventory list comprising a plurality of items at the location, utilizing the machine learning model, based on the description data, the inventory list further comprising inventory attributes associated with the plurality of items related to a context of the plurality of items at the location; determining, utilizing the machine learning model, based on the description data, interior and/or exterior condition information for the location, the interior and/or exterior condition information describing a quality of structural components of the location and/or hazards in and/or around the location; and generating, utilizing the machine learning model, based on the inventory list and the interior and/or exterior condition information, the inspection report for the location.

Item 17—The method of any other item, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, or a depth sensor.

Item 18—The method of any other item, wherein generating the inspection report comprises determining the inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

Item 19—The method of any other item, wherein description data is captured by a mobile computing device associated with a user and transmitted to one or more processors configured to control the machine learning model with or without user interaction.

Item 20—The method of any other item, wherein generating the inspection report comprises causing the machine learning model to determine one or more insurance underwriting estimates using at least one or more inventory attributes, the quality of structural components of the location, and the hazards in and/or around the location as inputs for the machine learning model.

Item 21—The method of any other item, further comprising receiving adjustments to the inventory list and/or the interior and/or exterior condition information, and using the adjustments and corresponding inventory attributes, quality of structural components of the location, and/or hazards in and/or around the location, as input to (1) update the inspection report, and/or (2) retrain the machine learning model.

Item 22—The method of any other item, wherein the description data is time stamped, geo stamped, and/or user stamped.

Item 23—The method of any other item, wherein the interior and/or exterior condition information comprises a description of a spatial position of the location relative to potential natural hazards.

Item 24—The method of any other item, wherein the description of the spatial position of the location relative to potential natural hazards is determined at least in part based on information from the external location information database.

Item 25—The method of any other item, wherein the inspection report is determined at least in part based on information from an external market information database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The embodiments described above can be directed to various combinations and sub combinations of the disclosed features and/or combinations and sub combinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment may be combined with one or more features of any other embodiment.

What is claimed is:

1. A system configured for generating an inspection report utilizing a machine learning model, the system comprising one or more hardware processors configured by machine-readable instructions to:
receive description data of a location, the description data generated via at least one of a camera, a user interface, an environment sensor, and an external location information database;
generate an inventory list comprising a plurality of items at the location, utilizing the machine learning model, based on the description data, the inventory list further comprising inventory attributes associated with the plurality of items related to a context of the plurality of items at the location;
determine, utilizing the machine learning model, based on the description data, interior and/or exterior condition information for the location, the interior and/or exterior condition information describing a quality of structural components of the location and hazards in and/or around the location;
the hazards determined by multiple stages of the machine learning model configured for predicting physical hazards at the location, the physical hazards changing over time and from location to location, each stage of the multiple stages being improved based on a required computing capability and a maximum allowable processing time for a given stage to minimize overall computing resources and processing time for the multiple stages, the hazards determined by:
predicting, with a first stage of the multiple stages, a potential hazard type based on the received description data, the potential hazard type comprising one potential hazard type of a set of predetermined potential hazard types, the first stage having a first configuration improved for potential hazard type predictions based on the received description data; and
predicting, with a second stage of the multiple stages, based on the predicted potential hazard type and the received description data, a physical hazard at the location, the second stage having a second configuration that is different from the first configuration, the second configuration associated with the predicted hazard type without regard for other potential hazard types, the second configuration improved for predicting the physical hazard at the location once the hazard type is predicted by the first stage, and
generate, utilizing the machine learning model, based on the inventory list and the interior and/or exterior condition information, the inspection report for the location.

2. The system of claim 1, wherein predicting the potential hazard type comprises identifying objects and structures at the location by one or more of: object detection, semantic segmentation, instance segmentation, and panoptic segmentation, object tracking through multiple images, feature-matching, optical flow estimation, relative camera pose estimation, multi-view projection, non-maximum suppression, class-based suppression, and heuristic suppression.

3. The system of claim 1, wherein predicting the physical hazard comprises 3-dimensional reconstruction of the location using a Structure from Motion (SfM) algorithm, Multi-View Stereo (MVS), Simultaneous Localization and Mapping (SLAM), and/or depth estimation algorithms.

4. The system of claim 1, wherein the first and second stages are trained with first and second training data, the first and second training data being different, the first training data comprising input-output training pairs associated with each potential hazard type in the set of predetermined potential hazard types, the second training data comprising input-output training pairs associated with only the predicted hazard type.

5. The system of claim 1, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, or a depth sensor.

6. The system of claim 1, wherein generating the inspection report comprises determining the one or more inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

7. The system of claim 1, wherein the description data is captured by a mobile computing device associated with a user and transmitted to the one or more processors with or without user interaction.

8. The system of claim 1, wherein generating the inspection report comprises causing the machine learning model to determine one or more insurance underwriting estimates using at least one or more inventory attributes, the quality of structural components of the location, and the hazards in and/or around the location as inputs for the machine learning model.

9. The system of claim 1, wherein the one or more hardware processors are further configured to receive adjustments to the inventory list and/or the interior and/or exterior condition information, and use the adjustments and corresponding inventory attributes, quality of structural components of the location, and/or hazards in and/or around the location, as input to (1) update the inspection report, and/or (2) retrain the machine learning model.

10. The system of claim 1, wherein the description data is time stamped, geo stamped, and/or user stamped.

11. The system of claim 1, wherein the interior and/or exterior condition information comprises a description of a spatial position of the location relative to potential natural hazards.

12. The system of claim 11, wherein the description of the spatial position of the location relative to potential natural hazards is determined at least in part based on information from the external location information database.

13. The system of claim 1, wherein the inspection report is determined at least in part based on information from an external market information database.

14. A method for generating an inspection report utilizing a machine learning model, the method comprising:
receiving description data of a location, the description data generated via at least one of a camera, a user interface, an environment sensor, and an external location information database;
generating an inventory list comprising a plurality of items at the location, utilizing the machine learning model, based on the description data, the inventory list further comprising inventory attributes associated with the plurality of items related to a context of the plurality of items at the location;
determining, utilizing the machine learning model, based on the description data, interior and/or exterior condition information for the location, the interior and/or exterior condition information describing a quality of structural components of the location and hazards in and/or around the location
the hazards determined by multiple stages of the machine learning model configured for predicting physical hazards at the location, the physical hazards changing over time and from location to location, each stage of the multiple stages being improved based on a required computing capability and a maximum allowable processing time for a given stage to minimize overall computing resources and processing time for the multiple stages, the hazards determined by:
predicting, with a first stage of the multiple stages, a potential hazard type based on the received description data, the potential hazard type comprising one potential hazard type of a set of predetermined potential hazard types, the first stage having a first configuration improved for potential hazard type predictions based on the received description data; and
predicting, with a second stage of the multiple stages, based on the predicted potential hazard type and the received description data, a physical hazard at the location, the second stage having a second configuration that is different from the first configuration, the second configuration associated with the predicted hazard type without regard for other potential hazard types, the second configuration improved for predicting the physical hazard at the location once the hazard type is predicted by the first stage; and
generating, utilizing the machine learning model, based on the inventory list and the interior and/or exterior condition information, the inspection report for the location.

15. The method of claim 14, wherein the description data comprises one or more media types, the one or more media types comprising at least one or more of video data, image data, audio data, text data, user interface/display data, and/or sensor data, and wherein receiving description data comprises receiving sensor data from one or more environment sensors, the one or more environment sensors comprising at least one of a GPS, an accelerometer, a gyroscope, a barometer, a microphone, Lidar, or a depth sensor.

16. The method of claim 14, wherein generating the inspection report comprises determining the inventory attributes, the inventory attributes comprising one or more of locations of the items at the location, a quality of items at the location, brand names of the items at the location, materials of the items at the location, damage to items at the location, age of the items at the location, condition of the items at the location, dimensions of the items at the location, or values of the items at the location.

17. The method of claim 14, wherein description data is captured by a mobile computing device associated with a user and transmitted to one or more processors configured to control the machine learning model with or without user interaction.

18. The method of claim 14, wherein generating the inspection report comprises causing the machine learning model to determine one or more insurance underwriting estimates using at least one or more inventory attributes, the quality of structural components of the location, and the hazards in and/or around the location as inputs for the machine learning model.

19. The method of claim 14, further comprising receiving adjustments to the inventory list and/or the interior and/or exterior condition information, and using the adjustments and corresponding inventory attributes, quality of structural components of the location, and/or hazards in and/or around the location, as input to (1) update the inspection report, and/or (2) retrain the machine learning model.

20. The method of claim 14, wherein the description data is time stamped, geo stamped, and/or user stamped.

21. The method of claim 14, wherein the interior and/or exterior condition information comprises a description of a spatial position of the location relative to potential natural hazards.

22. The method of claim 21, wherein the description of the spatial position of the location relative to potential natural hazards is determined at least in part based on information from the external location information database.

23. The method of claim 14, wherein the inspection report is determined at least in part based on information from an external market information database.

* * * * *